United States Patent
Georgi et al.

(10) Patent No.: US 12,453,693 B2
(45) Date of Patent: Oct. 28, 2025

(54) ENCAPSULATED FRAGRANCE COMPOUNDS BASED ON NATURAL AMINO ACIDS

(71) Applicant: SYMRISE AG, Holzminden (DE)

(72) Inventors: Julian Alexander Georgi, Holzminden (DE); Benjamin Rost, Bodenwerder (DE); Ralf Bertram, Holzminden (DE); Britta Raabe, Muenden (DE); André Haetzelt, Holzminden (DE); Joern Wiedemann, Holzminden (DE)

(73) Assignee: SYMRISE AG, Holzminden (DE)

( * ) Notice: Subject to any disclaimer, the term of this patent is extended or adjusted under 35 U.S.C. 154(b) by 743 days.

(21) Appl. No.: 17/782,466

(22) PCT Filed: Dec. 5, 2019

(86) PCT No.: PCT/EP2019/083903
§ 371 (c)(1),
(2) Date: Jun. 3, 2022

(87) PCT Pub. No.: WO2021/110273
PCT Pub. Date: Jun. 10, 2021

(65) Prior Publication Data
US 2023/0018872 A1     Jan. 19, 2023

(51) Int. Cl.
*A61K 8/87* (2006.01)
*A61K 8/06* (2006.01)
(Continued)

(52) U.S. Cl.
CPC ............ *A61K 8/87* (2013.01); *A61K 8/062* (2013.01); *A61K 8/11* (2013.01); *A61K 8/345* (2013.01); *A61K 8/41* (2013.01); *A61K 8/732* (2013.01)

(58) Field of Classification Search
CPC . A61K 8/87; A61K 8/062; A61K 8/11; A61K 8/345; A61K 8/41; A61K 8/732
See application file for complete search history.

(56) References Cited

U.S. PATENT DOCUMENTS

| | | | |
|---|---|---|---|
| 3,891,570 | A | 6/1975 | Fukushima et al. |
| 10,835,885 | B2 | 11/2020 | Rost et al. |

(Continued)

FOREIGN PATENT DOCUMENTS

| | | |
|---|---|---|
| CN | 104190336 A | 12/2014 |
| DE | 2303866 A1 | 8/1973 |

(Continued)

OTHER PUBLICATIONS

Translated International Search Report and Written Opinion from International Application No. PCT/EP2019/083903 dated Aug. 4, 2020.

(Continued)

*Primary Examiner* — Hong Yu
(74) *Attorney, Agent, or Firm* — MARSHALL, GERSTEIN & BORUN LLP

(57) ABSTRACT

The present invention relates to a process for the production of multilayer microcapsules, in particular multilayer odiferous substance capsules or fragrance compound capsules, which have improved stability and odiferous substance release or fragrance compound release compared to prior art capsules. In addition, the present invention relates to multilayer microcapsules comprising at least one hydrophobic odiferous substance or fragrance compound obtainable by the process of the invention. In another aspect, the invention described herein relates to multilayer microcapsules comprising a core comprising at least one hydrophobic odiferous substance or fragrance compound, and a capsule shell. In addition, the present invention relates to the use of the multilayer microcapsules and suspensions of the multilayer (Continued)

Figure 1:
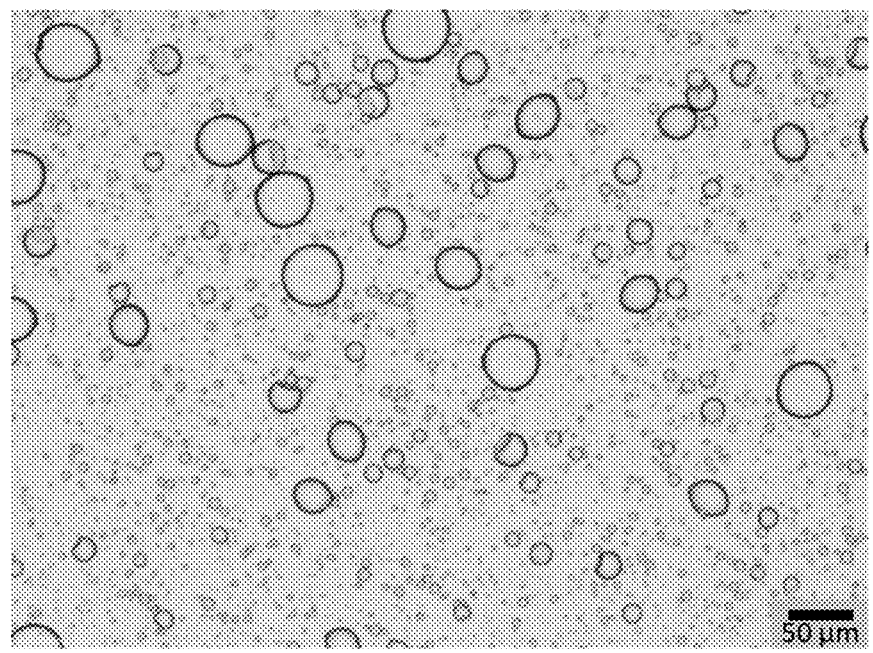

microcapsules as an ingredient in detergents, fabric softeners, cleaning products, scent boosters in liquid or solid form, cosmetics, personal care products, agricultural products or pharmaceutical products.

18 Claims, 4 Drawing Sheets

(51) Int. Cl.
    *A61K 8/11*     (2006.01)
    *A61K 8/34*     (2006.01)
    *A61K 8/41*     (2006.01)
    *A61K 8/73*     (2006.01)

(56) References Cited

U.S. PATENT DOCUMENTS

| | | | |
|---|---|---|---|
| 10,876,081 B2 | 12/2020 | Ott et al. | |
| 2008/0187596 A1* | 8/2008 | Dihora | C11D 3/3753 |
| | | | 424/490 |
| 2017/0252274 A1 | 9/2017 | Lei et al. | |

FOREIGN PATENT DOCUMENTS

| | | |
|---|---|---|
| EP | 2111214 B1 | 4/2011 |
| EP | 3238816 A1 | 11/2017 |
| JP | H0557178 A | 3/1993 |
| JP | H06142495 A | 5/1994 |
| JP | H08267914 A | 10/1996 |
| WO | WO-2017/148504 A1 | 9/2017 |
| WO | WO-2018/002214 A1 | 1/2018 |

OTHER PUBLICATIONS

"Microencapsulation of Perfumes for Application in Textile Industry", A Dissertation Presented to the Universidade Do Porto, 210 pages (2010).

* cited by examiner

ENCAPSULATED FRAGRANCE COMPOUNDS BASED ON NATURAL AMINO ACIDS

CROSS-REFERENCE TO RELATED APPLICATIONS

This is a U.S. National Phase of International Application PCT/EP2019/083903, filed Dec. 5, 2019.

The present invention relates to a process for the preparation of multilayer microcapsules, preferably multilayer odiferous substance capsules or fragrance compound capsules, which have improved stability and odiferous substance or fragrance compound release compared to prior art capsules. In addition, the present invention relates to multilayer microcapsules comprising at least one hydrophobic odiferous substance or fragrance compound obtainable by the process of the invention. In another aspect, the invention described herein relates to multilayer microcapsules comprising a core comprising at least one hydrophobic odiferous substance or fragrance compound, and a capsule shell. In addition, the present invention relates to the use of the multilayer microcapsules and suspensions of the multilayer microcapsules as an ingredient in detergents, fabric softeners, cleaning products, scent boosters in liquid or solid form, cosmetics, personal care products, agricultural products or pharmaceutical products.

The aim of encapsulation is, among other things, to ensure the targeted release of active ingredients, the conversion of liquids into a manageable powder form, the delay of losses of volatile components (e.g., in the case of flavorings), the prevention of premature chemical reactions with other mixture components, or better handling before or during processing. Encapsulated active ingredients, such as odiferous substances or fragrance compounds, can be incorporated into various application formulations in encapsulated form for this purpose.

The contents of microcapsules can subsequently be released in various ways and are based in particular on one of the mechanisms described below: mechanical destruction of the capsule by crushing or shearing; destruction of the capsule by melting of the wall material, destruction of the capsules by dissolution of the wall material or diffusion of the active ingredients through the capsule wall.

Nowadays, many articles of daily use, such as cleaning agents, waxes, shampoos, etc., are perfumed with fragrance compounds or fragrance compound mixtures. In order to prevent possible interactions of the fragrance compounds with the other ingredients of the product or, for example, to prevent volatilization of the fragrance compounds and thus not to falsify or reduce the desired odor impression, the fragrance compounds can be added to the formulation in encapsulated form. In this way, the desired odor impression can be guaranteed.

For example, document EP 2111214 B1 describes microcapsules with a odiferous core and an aminoplast polymer encapsulation. In addition to the high impermeability of the descriptive capsule shell, it is also highly resistant to reactive chemicals. The polycondensation of amine-formaldehyde pre-condensate, and the water-insoluble, hydrophobic active ingredient, such as a perfume oil, is initiated by a pH change.

DE 2303866 A1 describes microcapsules prepared from (a) an epoxypropyltrialkylammonium salt and additionally an alkylsulfosuccinate having alkyl groups with 6 to 16 carbon atoms or an alkylsulfosuccinamate whose carboxylic acid amide group is substituted with an alkyl group with 8 to 20 carbon atoms, and a water-miscible solvent as component (b).

The document EP 3238816 A1 discloses a process for the preparation of microcapsules, in particular aminoplast microcapsules, from a first aqueous preparation containing at least one prepolymer and a second non-aqueous preparation containing the active ingredient to be encapsulated, so that the average diameter of the capsules is reduced and standardized. Furthermore, the process described therein leads to a significant reduction of the microcapsule particle size and thus to a stabilization of the emulsion.

WO 2017/148504 A1 describes a process for the preparation of fragrance compound capsules exhibiting improved storage stability in an aqueous surfactant environment, wherein the fragrance composition, which has an acid number of not more than 5 mg KOH/g immediately prior to encapsulation, is encapsulated with natural coating materials or synthetic, anionic or cationic polymers or mixtures thereof.

Microcapsules can also be made from other polymerizable materials such as acrylate monomers, polyureas or even biopolymers. Isocyanate-based microcapsules are usually produced from polyisocyanates and guanidinium carbonate in an alkaline environment.

However, the prior art microcapsules described above have the disadvantage that polymeric capsule wall or capsule shell materials require a large polymer content to ensure sufficient stability and to avoid excessive loss of active ingredients. Furthermore, such microcapsules often do not have biodegradable properties. In addition, the release of the active ingredient in the application is usually insufficient.

In particular, the demand for bio-based and biodegradable solutions is growing due to the ever-increasing social pressure with regard to environmental aspects.

Against this background, the present invention was based on the complex task of providing a process for the production of microcapsules which makes it possible to provide highly stable microcapsules with a low polymer content, which at the same time exhibit excellent release behavior of the encapsulated active ingredients and have properties that are as biodegradable as possible.

Surprisingly, it was found that this task can be solved in that the targeted layered crosslinking at defined temperatures and targeted catalyzed mechanisms lead to stable multilayer microcapsules, thus ensuring efficient encapsulation of active ingredients with subsequent targeted release of these active ingredients, for example by mechanical rubbing or by pressure.

SUMMARY OF THE INVENTION

The present problem is solved by the objects of the independent patent claims. Preferred embodiments result from the wording of the dependent patent claims and the following description.

Thus, a first object of the present invention relates to a method for producing multilayer microcapsules, preferably multilayer odiferous substance capsules or fragrance compound capsules, comprising the following steps in this order:
a) forming a first crosslinking layer by:
a1) providing an internal non-aqueous phase comprising at least one isocyanate having two or more isocyanate groups and at least one active ingredient to be encapsulated;
a2) providing an external aqueous phase comprising at least one protective colloid;

a3) mixing the internal non-aqueous phase and the external aqueous phase to obtain an oil-in-water emulsion;
b) forming a second crosslinking layer by adding an amine that reacts at an acidic pH;
c) forming a third crosslinking layer by addition of a hydroxyl group donor;
d) forming at least a fourth crosslinking layer by adding at least one amine which reacts at an alkaline pH to obtain multilayer microcapsules;
e) curing the multilayer microcapsules obtained in step d); and optionally:
f) separating the microcapsules from the reaction solution and drying the microcapsules if necessary.

In addition, it is an object of the invention described herein to provide multilayer microcapsules comprising at least one hydrophobic odiferous substance or fragrance compound prepared by the process of the invention.

Another aspect of the present invention is multilayer microcapsules comprising a core comprising at least one hydrophobic odiferous substance or fragrance compound, and a capsule shell, wherein the capsule shell comprises or consists of, from the inside out:
(i) a first layer comprising or consisting of polyurethane;
(ii) a second layer comprising or consisting of polyurea;
(iii) a third layer comprising or consisting of polyurethane; and
(iv) at least one fourth layer comprising or consisting of polyurea.

Finally, in a further aspect, the present invention relates to the use of the multilayer microcapsule or suspension of the multilayer microcapsules according to the invention, for the manufacture of detergents, fabric softeners, cleaning agents, scent boosters in liquid or solid form, cosmetics, personal care products, agricultural products or pharmaceutical products.

Surprisingly, it was found in the context of the present invention that the combination of targeted, defined and layered deposition of cross-linked capsule wall materials at defined temperatures and targeted catalyzed mechanisms leads to stable multilayer microcapsules, thus ensuring efficient encapsulation of active ingredients with subsequent targeted release of these active ingredients, for example by mechanical rubbing or by pressure.

Furthermore, the multilayer microcapsules described herein exhibit good biocompatibility due to their biobased and biodegradable building blocks, such as amino acids and starch.

Furthermore, a significant saving in capsule wall material could be achieved by the process described herein.

These and other aspects, features and advantages of the present invention will be apparent to those skilled in the art from a study of the following detailed description and claims. In this regard, any feature from one aspect of the invention may be used or substituted in another aspect of the invention. The examples herein illustrate the invention without limiting it.

The terms "at minimum one" or "at least one" or "one or more" as used herein refers to 1 or more, for example 2, 3, 4, 5, 6, 7, 8, 9 or more.

Numeric examples given in the form "from x to y" include the named values. If multiple preferred numeric ranges are specified in this format, all ranges created by combining the different endpoints are also included.

FIGURES

FIG. 1 is a light microscope image of the multilayer microcapsules produced from 100% longer-chain diisocyanate according to the invention. An Olympus BX51 was used for the light microscope image. The bar shown corresponds to 50 µm.

Figure 2:
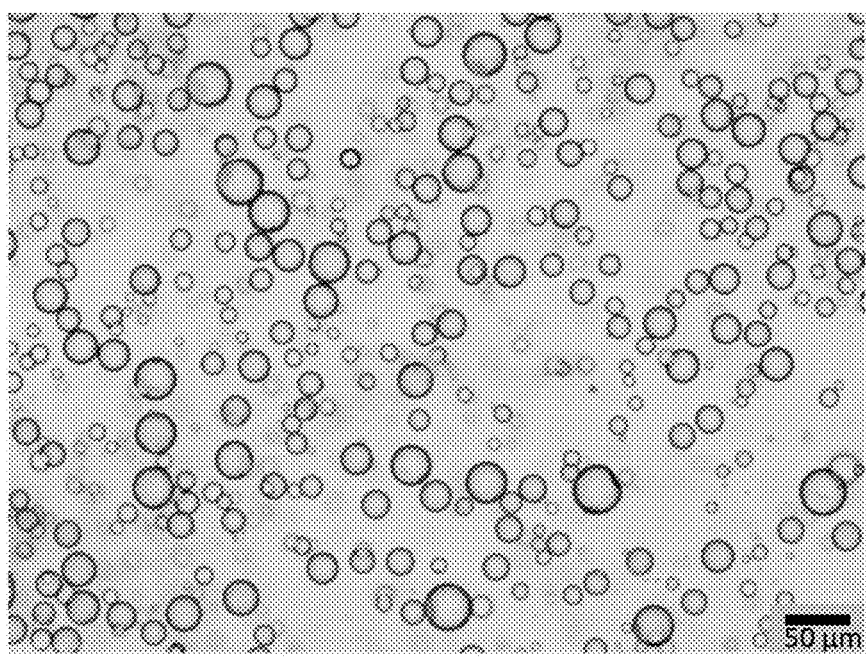

FIG. 2 is a light microscope image of the multilayer microcapsules produced from 100% shorter-chain diisocyanate according to the invention. An Olympus BX51 was used for the light microscope image. The bar shown corresponds to 50 µm.

Figure 3:
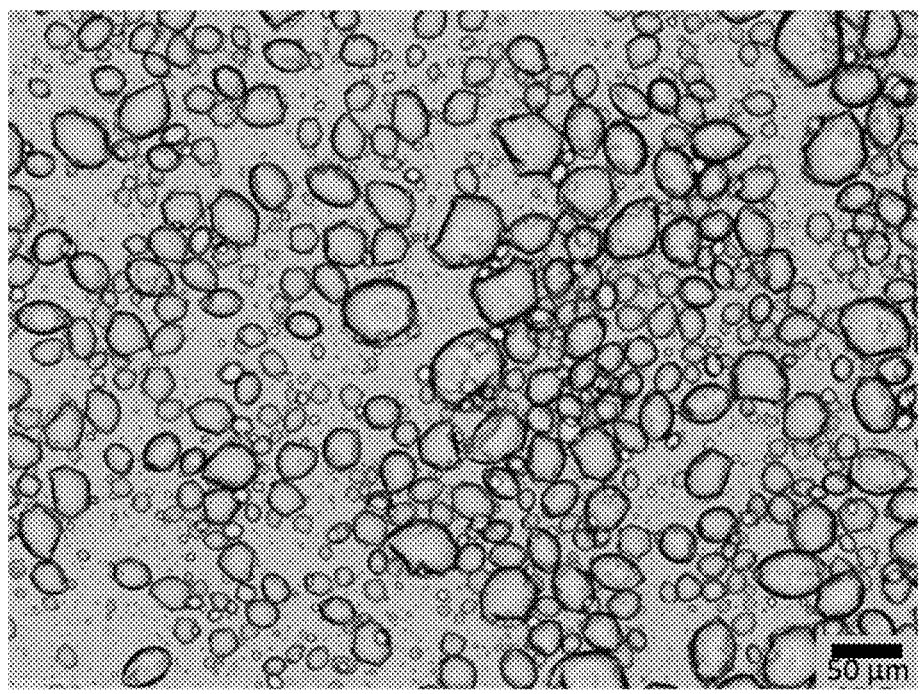

FIG. 3 is a light microscope image of the multilayer microcapsules produced from 50% longer-chain diisocyanate and 50% shorter-chain diisocyanate according to the invention. An Olympus BX51 was used for the light microscopic image. The bar shown corresponds to 50 µm.

Figure 4:
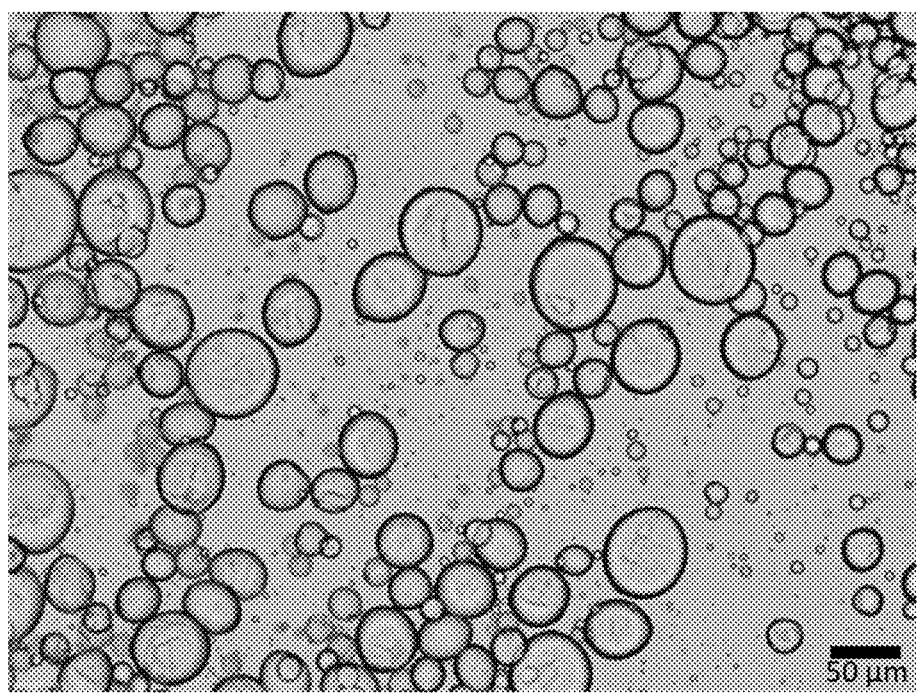

FIG. 4 is a light microscope image of the multilayer microcapsules produced from 80% longer-chain diisocyanate and 20% aromatic diisocyanate according to the invention. An Olympus BX51 was used for the light microscopic image. The bar shown corresponds to 50 µm.

Figure 5:
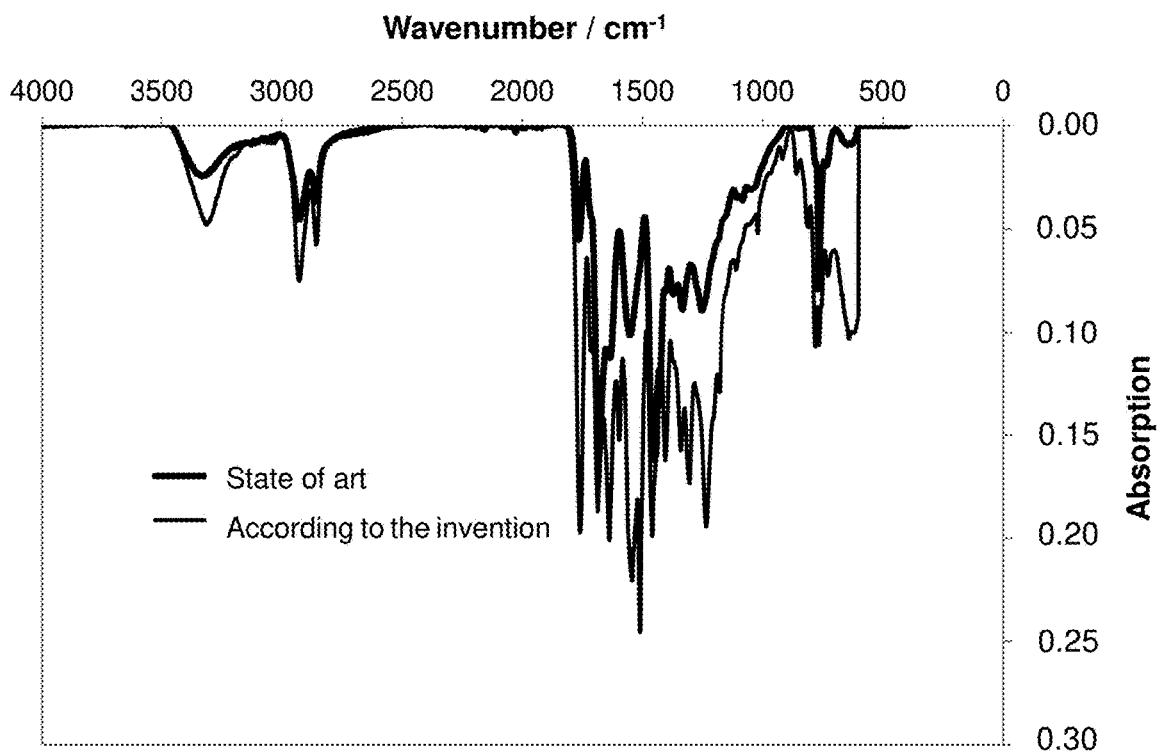

FIG. 5 is a diagram showing the results of an IR spectroscopic analysis of prior art microcapsules, i.e., microcapsules based on a pure network of polyurea structures, and microcapsules according to the invention. The analysis was performed using ATR infrared spectroscopy (Attenuated Total Reflection).

Figure 6:
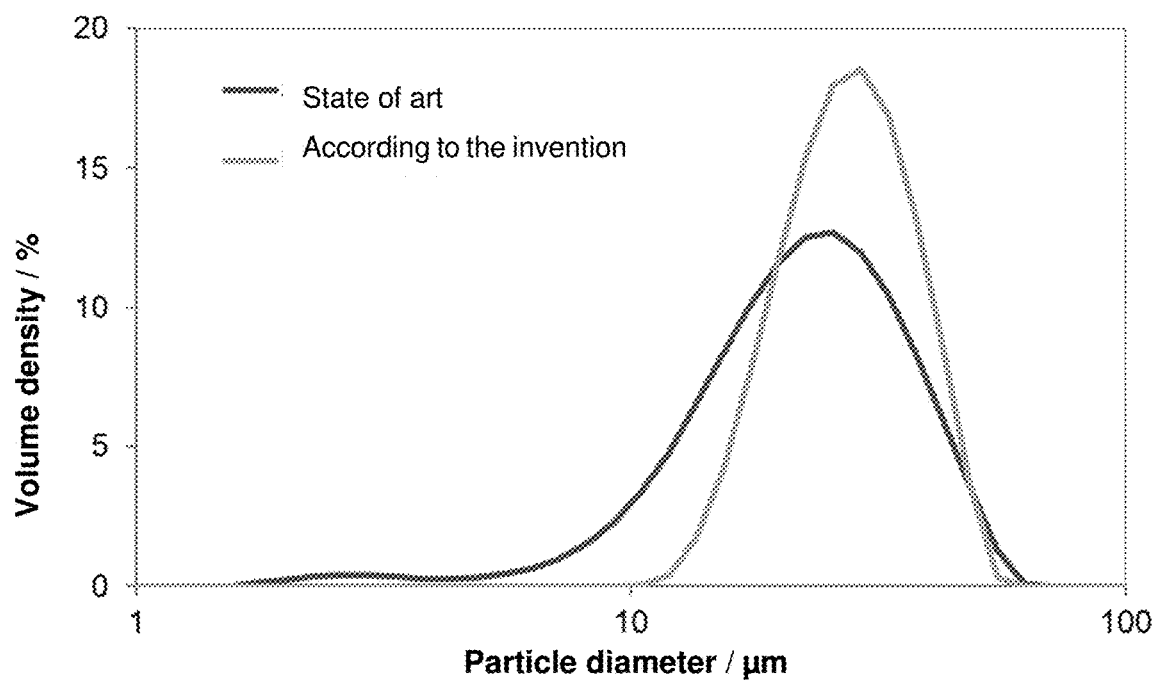

FIG. 6 shows a diagram of the particle size distribution (d(0.5)-value) of multilayer microcapsules according to the invention and prior art microcapsules based on a pure polyurea network. A MALVERN Mastersizer 3000 was used to determine the particle size distribution. The corresponding calculation is based on the Mie theory.

Figure 7:
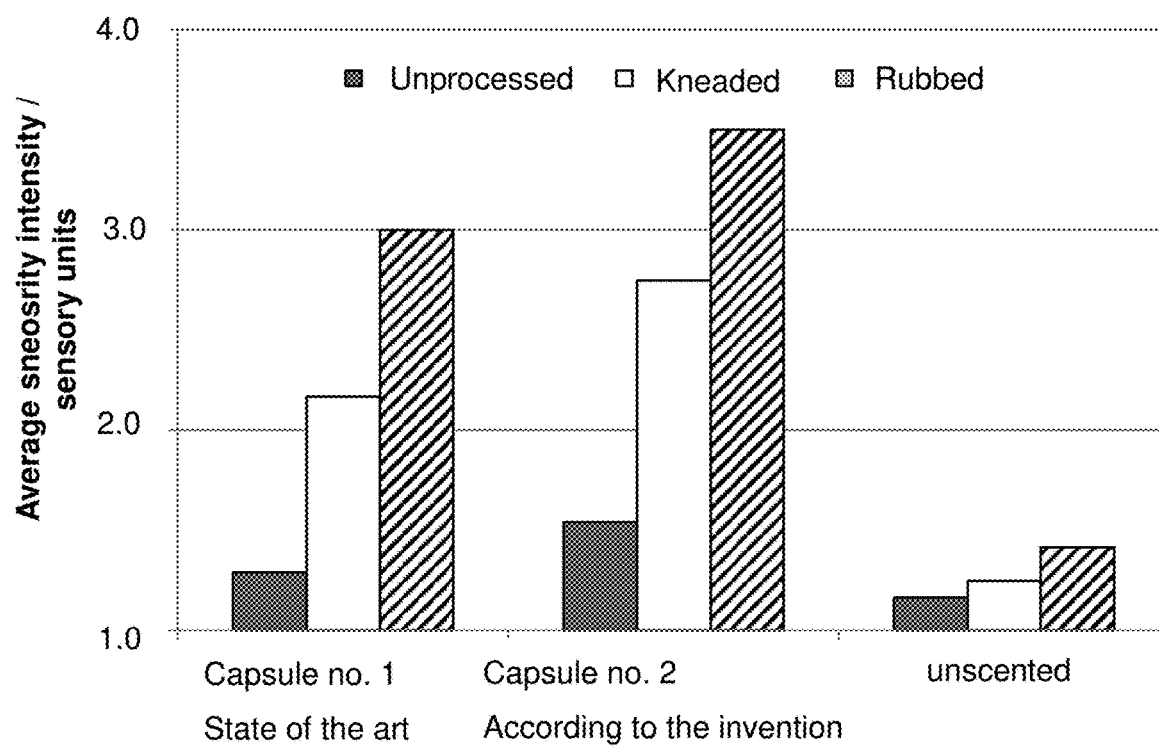

FIG. 7 is a diagram showing the results of a sensory evaluation of prior art microcapsules, i.e., microcapsules based on a pure network of polyurea structures, and microcapsules according to the invention.

DETAILED DESCRIPTION OF THE INVENTION

In a first aspect, the present invention relates to a method for producing multilayer microcapsules, preferably a method for producing multilayer odiferous substance capsules or fragrance compound capsules comprising or consisting of the following steps in this order:
a) forming a first crosslinking layer by:
a1) providing an internal non-aqueous phase comprising at least one isocyanate having two or more isocyanate groups and at least one active ingredient to be encapsulated;
a2) providing an external aqueous phase comprising at least one protective colloid, preferably the protective colloid is a polysaccharide, particularly preferably starch;
a3) mixing the internal non-aqueous phase and the external aqueous phase to obtain an oil-in-water emulsion;
b) forming a second crosslinking layer by addition of an amine which reacts at an acidic pH;
c) forming a third crosslinking layer by addition of a hydroxyl group donor;
d) forming at least a fourth crosslinking layer by adding at least one amine which reacts at an alkaline pH to obtain multilayer microcapsules;
e) curing the multilayer microcapsules obtained in step d); and optionally:
f) separating the microcapsules from the reaction solution and drying the microcapsules if necessary.

In the context of the present invention, multilayer microcapsules are understood to be microparticles that have a capsule shell or capsule wall and one or more active ingredients as the core material inside the capsule. Preferably, these are hydrophobic active ingredients. The terms "microcapsule" and "capsule" are used synonymously for the purposes of the present invention.

In the context of the present invention, the capsule shell or capsule wall is preferably composed of several layers, which preferably have different compositions. Thus, a particularly preferred embodiment of the capsule shell comprises at least one polyurethane-based and at least one polyurea-based (crosslinking) layer. In particular, alternating layers comprising polyurethane and polyurea structures are preferred.

In a first step of the process according to the invention, a first crosslinking layer is formed. For this purpose, an internal non-aqueous phase is provided, which comprises at least one isocyanate with two or more isocyanate groups and at least one active ingredient to be encapsulated.

The at least one isocyanate used in the production process described herein has at least two isocyanate groups for the formation of polymeric networks and thus for the formation of the capsule shell or capsule wall by polymerization. Corresponding polymerizable isothiocyanates, alone or in combination with isocyanates, are also applicable for use in the process according to the invention. Aliphatic, cycloaliphatic, hydroaromatic, aromatic or heterocyclic polyisocyanates or polyisothiocyanates, their substitution products and mixtures of the aforementioned monomeric or oligomeric compounds are particularly preferred, aliphatic and/or aromatic compounds preferably being used. Among the polyisocyanates, diisocyanates are particularly preferred and are therefore used primarily in the implementation of the present invention.

Therefore, in a preferred embodiment, the present invention relates to a process for the preparation of multilayer microcapsules, wherein the at least one isocyanate having two or more isocyanate groups is selected from the group consisting of aliphatic isocyanates and/or aromatic isocyanates and the corresponding isothiocyanates. Preferably, the aliphatic isocyanates used have five or more carbon atoms.

In a particularly preferred embodiment, the internal non-aqueous phase comprises mixtures of different polymerizable isocyanates and/or isothiocyanates which can form copolymers.

Examples of the monomeric isocyanates and/or isothiocyanates which can be used according to the invention and which contain at least two isocyanate groups or isothiocyanate groups are:
ethylene diisocyanate, trimethylene diisocyanate, 1,4-tetramethylene diisocyanate, 1,6-hexamethyldiisocyanate, ethylene diisothiocyanate, tetramethylene diisothiocyanate, hexamethylene diisothiocyanate, cyclobutane-1,3-diisocyanate, cyclohexane-1,3-diisocyanate, cyclohexane-1,4-diisocyanate, 1,3-phenylene diisocyanate, 1,4-phenylene diisocyanate, mixtures of 1,3-phenylene diisocyanate and 1,4-phenylene diisocyanate, p-phenylene diisothiocyanate, xylylene-1,4-diisothiocyanate, 2,4-toluylene diisocyanate, 2,6-toluylene diisocyanate, mixtures of 2,4-toluylene diisocyanate and 2,6-toluylene diisocyanate, xylylene-1,4-diisocyanate, xylylene-1,3-diisocyanate and mixtures of xylylene-1,4-diisocyanate and xylylene-1,3-diisocyanate, 2,4-hexahydrotoluylene diisocyanate, 2,6-hexahydrotoluylene diisocyanate, mixtures of 2,4-hexahydrotoluylene diisocyanate and 2,6-hexahydrotoluylene diisocyanate, hexahydro-1,3-phenylene diisocyanate, hexahydro-1,4-phenylene diisocyanate, mixtures of hexahydro-1,4-phenylene diisocyanate and hexahydro-1,4-phenylene diisocyanate, 1,3-diisocyanatobenzene, 1,3,5-trimethylbenzene-2,4-diisocyanate, 1,3,5-triisopropylbenzene-2,4-diisocyanate, diphenylmethane-4,4'-diisocyanate, 3,3'-dimethyldiphenylmethane-4,4'-diisocyanate, 4,4'-diphenylpropane diisocyanate, naphthylene-1,4-diisocyanate, naphthylene-1,5-diisocyanate, triphenylmethane-4,4',4''-triisocyanate, toluene-2,4,6-triisocyanate, dimethyldiphenylmethane-2,2',5,5'-tetraisocyanate or mixtures of the above compounds.

As polymerizable compounds containing at least two isocyanate or isothiocyanate groups, preference is given to di and polyisocyanates produced on an industrial scale, for example TDI: toluylene diisocyanate (isomer mixture of 2,4- and 2,6-toluylene diisocyanate in a ratio of 80:20), HDI: hexamethylene diisocyanate-(1,6), IPDI: isophorone diisocyanate or DMDI: diphenylmethane-4,4'-diisocyanate.

Other particularly preferred monomeric isocyanate compounds are: diisocyanates such as 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate), 4,4'-diisocyanatodicyclohexylmethane, 2,4- and 2,6-diisocyanatomethylcyclohexane and mixtures thereof. In principle, aromatic isocyanates, e.g. toluylene diisocyanates or 4,4'-diisocyanatodiphenylmetha can also be used.

Polyisocyanates which can be prepared by modifying the above-mentioned diisocyanates or mixtures thereof by known methods and which contain, for example, uretdione, urethane, isocyanurate, biuret and/or allophanate groups can also be used proportionally.

Surprisingly, it has been shown that the use of longer-chain aliphatic diisocyanates with six or more carbon atoms in particular, leads to the formation of more stable capsule shells or capsule walls.

Even more preferred is the combination of at least two different (preferably aliphatic and/or aromatic) diisocyanates. In a preferred further embodiment of the invention, the different (preferably aliphatic) diisocyanates also have different chain lengths. Primary embodiments comprise, in particular, mixtures of longer-chain and shorter-chain diisocyanates in any desired mixing ratios. Preferably, the mixing ratio of longer-chain diisocyanates to shorter-chain diisocyanates is in a range from 4:1 to 1:4 and particularly preferably from 2:1 to 1:2. Longer-chain diisocyanates in this context preferably have six or more carbon atoms, but even more preferably they have six to twelve carbon atoms and particularly preferably six to eight carbon atoms. By shorter-chain diisocyanates is meant diisocyanates having one to five carbon atoms and preferably diisocyanates having three to five carbon atoms.

It has been shown that particularly stable and better, i.e., more densely branched, cross-links are produced within the capsule shell if fundamentally different diisocyanates were used in a mixed form, and in particular if a mixture of longer-chain and shorter-chain aliphatic isocyanates was selected, or else a mixture of aliphatic and aromatic isocyanates (and/or isothiocyanates) was used.

Thus, the process described herein could be used to produce well-performing microcapsules provided from a mixture of linear and aromatic isocyanates as well as from a mixture of two different linear isocyanates. Such microcapsules exhibit outstanding scent storage properties and associated excellent fragrance compound release, particularly when used as fragrance compound capsules, as illustrated by the following embodiments.

The combination of different polymerizable isocyanates therefore leads to particularly stable capsule shells or capsule walls, which in turn is reflected in better performance (fragrance compound release) of the capsules, for example in the area of odiferous substance- or fragrance compound encapsulation. Accordingly, in principle, the combination of at least two different polymerizable (preferably aliphatic and/or aromatic) isocyanates is preferred in the present invention.

Such microencapsulation of fragrance compounds or fragrance compound mixtures also offers the possibility of reducing or completely preventing interactions in the perfumed product or evaporation of the highly volatile odiferous components.

FIGS. 1 to 4 show the influence of the chain length of the isocyanates on the resulting microcapsules. FIG. 1 shows the light microscope image of microcapsules according to the invention produced exclusively from longer-chain diisocyanates, in this case the isocyanate hexamethylene diisocyanate, while FIG. 2 shows microcapsules based on shorter-chain diisocyanates, such as the isocyanate pentamethylene diisocyanate. The microcapsules shown in FIG. 2 have a more homogeneous morphology, but are less stable.

FIGS. 3 and 4 show microcapsules based on mixed isocyanates according to the invention: FIG. 3 shows the morphology of microcapsules based on a mixture of 50% shorter-chain and 50% longer-chain aliphatic isocyanates (mixture of hexamethylene diisocyanate and pentamethylene diisocyanate in the ratio 50:50), while FIG. 4 shows a corresponding mixture of 80% longer-chain diisocyanates and 20% of an aromatic diisocyanate (hexamethylene diisocyanate and 4,4'-methyldiphenylene diisocyanate in the ratio 80:20).

Overall, the microcapsules prepared from mixed aliphatic and/or aromatic isocyanates exhibit better stabilities and are therefore primarily suitable for the process described herein and therefore for the preparation of the multilayer microcapsules according to the invention, which exhibit excellent stabilities and active ingredient release properties, as illustrated in the following embodiments.

Particularly preferred in this context is the use of aliphatic isocyanates and/or isothiocyanates with chain lengths of one to twelve carbon atoms in the chain, preferably three to eight carbon atoms and particularly preferably four to seven carbon atoms for the production of multilayer microcapsules according to the present invention.

Polymerizable aliphatic isocyanates are particularly preferable in this context due to their chemical relationship to biobased systems. For example, both lysine and 1,5-diisocyanatopentane show the same degradation product, 1,5-diaminopentane, and are therefore particularly suitable for use in the production of biobased and biodegradable microcapsules, taking environmental aspects into account.

Therefore, in a particularly preferred embodiment, the present invention further relates to a process for preparing multilayer microcapsules comprising at least two aliphatic isocyanates having two or more isocyanate groups, wherein the at least two isocyanates have different chain lengths.

Preferred is further a process comprising at least two aliphatic isocyanates and/or isothiocyanates having two or more isocyanate/isothiocyanate groups, wherein the at least two isocyanates/isothiocyanates have different chain lengths.

Preferably, at least one of the aliphatic isocyanates and/or isothiocyanates has a chain length of five or more carbon atoms.

In a further embodiment, mixtures of isocyanate and isothiocyanate compounds in the internal non-aqueous phase are thus also conceivable in principle, which exhibit the above-mentioned properties.

It was observed that the choice of at least two aliphatic isocyanates of different chain lengths or the choice of mixtures of aliphatic and aromatic isocyanates lead to a significant gain in stability and performance (fragrance compound release in the case of odiferous substance capsules or fragrance compound capsules) due to the different reaction times, dissociations and crosslinking structures.

Furthermore, the microcapsules described herein can be prepared from aromatic isocyanates having two or more isocyanate groups.

Therefore, in another embodiment, the present invention relates to a process for preparing multilayer microcapsules, wherein the isocyanate(s) having two or more isocyanate groups is/are selected from the group consisting of aromatic isocyanates.

Also in this case, a mixture of several aromatic isocyanates (or isothiocyanates) can be used.

The proportion of the isocyanate component to the internal non-aqueous phase is preferably between 1:50 and 1:20, even more preferably between, 1:40 and 1:30.

The internal non-aqueous phase may therefore contain, for example, 0.1 to 10.0% by weight and preferably 0.5 to 3.0% by weight of isocyanate based on the total weight of the internal non-aqueous phase.

Due to the low proportion of the isocyanate component, it is possible, based on the present invention, to produce multilayer microcapsules in which the absolute isocyanate content is only 1/50th of the total capsule comprising the active ingredient(s). Thus, multilayer microcapsules having, for example, an isocyanate content of only 0.6% by weight could be produced by the process described herein. Preferably, however, the isocyanate content is about 1.1% by weight of the capsule wall.

In the process according to the invention for the production of the multilayer microcapsules, the at least one polymerizable isocyanate and/or isothiocyanate is first dissolved in an inert, non-aqueous solvent or solvent mixture together with the active ingredient(s) to be encapsulated. Thereby, in the context of the present description, the active ingredient to be encapsulated is preferably a hydrophobic active ingredient. By choosing such an active ingredient, it can be ensured that the material to be encapsulated is in the internal non-aqueous phase and does not mix with the external aqueous phase. This results in the hydrophobic active ingredient being effectively entrapped inside the multilayer microcapsule as the core material. The internal non-aqueous phase thus formed is further characterized by its organic hydrophobic oily character.

Suitable inert solvents for the internal non-aqueous phase are: chlorinated diphenyl, chlorinated kerosene, vegetable oils such as cottonseed oil, peanut oil, palm oil, tricresyl phosphate, silicone oil, dialkyl phthalates, dialkyl adipates, partially hydrogenated terphenyl, alkylated biphenyl, alkylated naphthalene, diaryl ether, aryl alkyl ether and higher alkylated benzene, benzyl benzoate, isopropyl myristate as well as any mixtures of these hydrophobic solvents and mixtures of single or multiple of these hydrophobic solvents with kerosene, kerosenes and/or isoparaffins. Preferably, vegetable oils such as sunflower oil, triglycerides, benzyl benzoate or isopropyl myristate are used as solvents for providing the internal non-aqueous phase.

The ratio of the active ingredient component to the internal non-aqueous phase is preferably about 1:14. The internal non-aqueous phase can therefore comprise, for example, 88 to 99% by weight and preferably 92 to 96% by weight of the active ingredient (or active ingredient mixture) to be encapsulated, based on the total active ingredient capsule. The capsule as a whole, in this context, comprises both the oil core, i.e., the active ingredient (or active ingredient mixture) and the capsule wall components formed from isocyanate component and the respective crosslinkers from the external aqueous phase.

Thus, it is possible to encapsulate a significantly larger amount of active ingredient using the process described herein, in contrast to prior art microcapsules.

Further, the first step of the method described herein comprises providing an external aqueous phase comprising at least one protective colloid.

For this purpose, the protective colloid is dissolved in the aqueous solvent (preferably water). Preferably, the protective colloid is a polysaccharide, and starch is particularly preferred.

Thus, a particularly preferred embodiment of the present invention relates to a process for the production of multilayer microcapsules, wherein the protective colloid is a polysaccharide, in particular starch.

A protective colloid is a compound which prevents the primary particles from clumping together (agglomeration, aggregation, flocculation, coagulation) in precipitation reactions, i.e., in reactions in which a solid phase is deposited from a homogeneous liquid phase. In the production of oil-in-water emulsions, the protective colloid attaches itself to the primary particles with its hydrophobic part and turns its polar, i.e., hydrophilic, molecular part towards the aqueous phase. By this attachment to the interface, it lowers the interfacial tension and prevents agglomeration of the primary particles. It also stabilizes the emulsion and promotes the formation of comparatively smaller droplets and thus also corresponding microcapsules.

The protective colloid used in the process according to the invention is preferably a polysaccharide, in particular starch, especially starch from wheat, potatoes, corn, rice, tapioca or oats, or chemically, mechanically and/or enzymatically modified starch (succinates, acetates, formates), as well as mixtures of the aforementioned compounds. Other suitable protective colloids include carboxymethylcelluloses, gum arabic, proteins, gelatin, polyols, polyphenols or polyvinylpyrrolidone, polyvinyl alcohol, polyvinyl alcohol derivatives, such as ammonium derivatives, and mixtures of the above compounds.

Most preferably, however, starches are used as protective colloid. Particularly preferred, therefore, is the use of (modified) starch as protective colloid for the production of the multilayer microcapsules.

The protective colloids used herein have a dual function in that, on the one hand, they react with the isocyanate(s) under polymerization to form a first or further crosslinking layer, and thus build up the capsule wall or capsule shell and are an integral part thereof, and, on the other hand, in that they act as a protective colloid and thus prevent agglomeration of the solid particles, stabilize the emulsion subsequently formed and thus promote the formation of small droplets.

It is therefore particularly preferred that the selected protective colloid has polymerizable properties, such as in the case of starch by the presence of at least one hydroxyl group.

Starches are naturally occurring polysaccharides that are biodegradable. In combination with the isocyanates described herein, the present process can thus provide biobased and biodegradable capsule shells. In the process described herein, the starch therefore functions primarily as a so-called bio crosslinker.

According to the present invention, the ratio of the amount of protective colloid or colloids used relative to the aqueous phase is preferably in a range from 1:50 to 1:10, more preferably in a range from 1:40 to 1:30.

The amount of protective colloid used, or the amount of a combination of protective colloids used, is thus in a range from 1 to 8% by weight, preferably in a range from 2 to 4% by weight, even more preferably in a range from 3 to 4% by weight, based on the total weight of the external aqueous phase.

The oil-in-water emulsion is formed by mixing the internal non-aqueous phase and the external aqueous phase. The weight ratio of internal non-aqueous phase to external aqueous phase is preferably in a range of 2:1 to 1:10, more preferably in a range of 1:2 to 1:4.

The ratio of protective colloid in the external aqueous phase to isocyanate or isothiocyanate in the internal non-aqueous phase is in a range from 1:5 to 1:2, preferably in a range from 1:2 to 1:1.

Emulsion formation in the case of liquid active ingredients or suspension formation in the case of solid active ingredients, i.e., emulsification or suspension of the internal non-aqueous or oily phase with the external aqueous or hydrophilic phase, takes place under high turbulence or strong shear, whereby the strength of the turbulence or shear determines the diameter of the microcapsules obtained. The production of the microcapsules can be continuous or discontinuous. As the viscosity of the aqueous phase increases or the viscosity of the oily phase decreases, the size of the resulting capsules generally decreases.

The process according to the invention for the production of multilayer microcapsules can be carried out, for example, by means of a forced metering pump using the "inline" technique, or also in conventional dispersion apparatus or emulsifying apparatus with stirring.

Emulsification of the external aqueous phase and the internal non-aqueous phase was carried out for the production of multilayer microcapsules according to the invention by means of an emulsifying turbine (IKA Eurostar 20 high-speed stirrer). The process of emulsification in the first step of the process according to the invention is advantageously carried out for a time from 30 seconds to 20 minutes, preferably from 1 to 4 minutes, at a stirring speed from 2000 rpm to 5000 rpm, preferably at 3250 rpm to 4500 rpm.

Optionally, it is possible to dissolve or disperse so-called stabilizers or emulsifying aids in the external aqueous phase to stabilize the formed emulsion and prevent segregation of the internal non-aqueous (oily/organic/hydrophobic) phase and the external aqueous (hydrophilic) phase.

It has been surprisingly shown that the further addition of a catalyst to the emulsion or suspension leads to the formation of a first inner core shell of protective colloid and isocyanate at the interfaces of the emulsified or suspended hydrophobic (active ingredient) particles or droplets to be encapsulated. Interfacial polymerization can result in the formation of a capsule shell or capsule wall, which encloses the active ingredient(s) in its interior as a capsule core.

The formation of this first capsule layer is based on the polyaddition reaction of the isocyanate or isocyanates (and/or the corresponding isothiocyanates) with the (preferably polymerizable) protective colloid, preferably starch, to form a capsule shell or capsule wall based on a polyurethane structure.

Therefore, a preferred embodiment of the present invention relates to a process for the preparation of multilayer microcapsules, wherein the first crosslinking layer is formed from protective colloid and isocyanate in the presence of a catalyst.

The catalyst added in the process according to the invention is preferably diazabicyclo[2.2.2]octane (DABCO). DABCO, also known as triethylenediamine (TEDA), a bicyclic tertiary amine. DABCO is generally used as a catalyst for the production of polyurethane plastics. The tertiary amine with free electron pairs promotes the reaction between the at least one polymerizable isocyanate in the internal non-aqueous phase and the hydroxyl groups (alcohol groups) of the protective colloid in the external aqueous phase.

The amount in which the catalyst is added to the emulsion or suspension is in a range of 0.01 to 1% by weight and preferably in a range of 0.05 to 0.2% by weight, based on the total weight of the emulsion or suspension. In the case of sluggish polymerization reactions, the amount of catalyst required can be adjusted accordingly.

Thus, the ratio of catalyst in the emulsion or suspension to the at least one isocyanate or isothiocyanate in the internal non-aqueous phase is preferably in a range from 1:20 to 1:50.

It has been shown to be advantageous that the catalyst is first dispersed in water and then added to the emulsion or suspension with stirring.

lets to be encapsulated by interfacial polymerization, which represents the inner first capsule shell, while the hydrophobic active ingredient particles or droplets to be encapsulated represent the core of the microcapsules according to the invention. The interfacial polymerization in this case corresponds to a polyaddition reaction of the polyisocyanate(s) or isothiocyanate(s) (or mixtures thereof) with the protective colloid, i.e., preferably with starch, to form a crosslinked polyurethane-based capsule shell in the presence of a catalyst. Therefore, the addition of a catalyst causes the efficient formation of the first innermost polyurethane-based shell layer.

The polyaddition reaction described herein is generally characterized by the reaction of individual polymers or oligomers having two or more functional groups with bond linkage and rearrangement of a hydrogen atom, such as by reaction of polyisocyanates or polyisothiocyanates and polyols (for example, polysaccharides such as starch).

The polyaddition reaction of the at least one polyisocyanate, preferably a diisocyanate, with the protective colloid, preferably starch (a polyol), leads to the formation of so-called urethane bridges (—NH—CO—C—) by addition of the hydroxyl groups of the polyol (—OH) to the carbon atom of the carbon-nitrogen bond of the isocyanate groups (—N=C=O) according to the following reaction scheme:

Reaction scheme 1

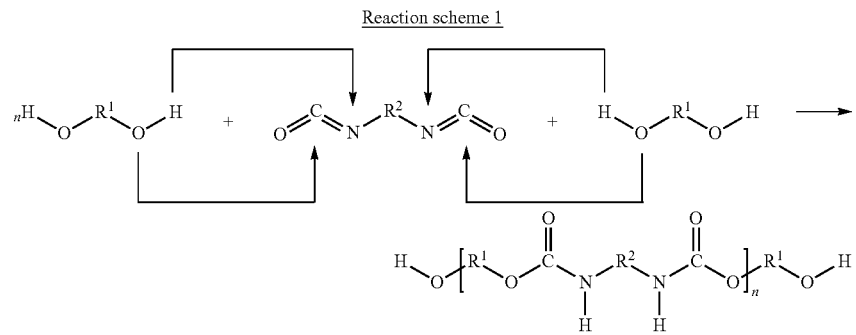

The catalyst is preferably added at a stirring speed of 500 rpm to 2000 rpm, particularly preferably at 1000 rpm to 1500 rpm, and at temperatures of 20° C. to 35° C., preferably at temperatures of 22° C. to 26° C.

It was also surprising that the addition of the catalyst after the emulsification or suspension step leads to a significant increase in capsule stability. Capsules prepared in this way exhibit significantly higher stability, even after 10 days at 50° C., and a marked reduction in free perfume oil compared with reference capsules in which the catalyst is added in the aqueous phase before emulsification or suspension.

Particularly stable capsules could be prepared with the catalyst diazabicyclo[2.2.2]octane (DABCO). In the examples described herein, an increase in stability by at least a factor of 3 was observed.

According to a particularly preferred embodiment, the catalyst is therefore diazabicyclo[2.2.2]octane (DABCO).

Therefore, the present invention further relates, in a particularly preferred embodiment, also to a process for the preparation of multilayer microcapsules comprising the addition of a catalyst in a step a 4) after step a3).

After addition of the catalyst to the emulsion or suspension, a first crosslinking layer forms at the interfaces of the emulsified or suspended active ingredient particles or drop- In this way, a hydrophilic boundary layer, i.e., capsule shell, can be formed which prevents the diffusion of the hydrophobic active ingredient (or active ingredient mixture) enclosed in the capsule. In the case of fragrance compounds and odiferous substances, for example, this leads to effective enclosure of the sensory active ingredient (fragrance compound mixture/perfume oil, single fragrance compound), which is only effectively released by mechanical activation.

In the case of the reaction of diisocyanates with diols, linear polyurethane chains are thus generally formed, which can be spatially crosslinked in a targeted manner by means of an excess of isocyanate over the amino groups of the uncrosslinked polyurethane chains.

The higher the number of crosslinking functional groups, the greater the spatial crosslinking and the more stable the resulting capsule shell or capsule wall of the microcapsule. In addition to the number of functional groups, i.e., the number of branches, the chain length of the individual building blocks significantly influences the mechanical properties, i.e., the stability of the capsules. In this context, the large number of hydroxyl groups of the protective colloid starch should be noted, which thus enables the formation of spatially particularly pronounced cross-links.

Further protective colloids or mixtures thereof as well as additional emulsifying aids or stabilizers are generally not necessary to ensure efficient crosslinking, but can be added if necessary, on the one hand to improve the emulsification process or suspension process in the case of insufficient crosslinking, and on the other hand to increase the crosslinking density and rate.

This rection with formation of a first innermost polyurethane-based crosslinking layer (first layer of the capsule shell or capsule wall) takes place in the presence of the catalyst already at room temperature and especially preferably at temperatures between 25 and 40° C.

Isocyanate-based capsule shells can normally only be used to encapsulate selected active ingredients. Encapsulation with isocyanates is thus not suitable for encapsulating active ingredients with aldehyde, carboxylic acid or ester functionalities, since such active ingredients are deprotonated, oxidized or saponified at an alkaline pH, making the resulting emulsion unstable. Consequently, the relatively neutral pH at which the polyurethane-based encapsulation is carried out enables the effective encapsulation of such active ingredients. The present process thus allows particularly mild conditions due to the selected pH ranges, so that no pH extremes are present and thus theoretically there are no longer any limitations with regard to the active ingredients to be encapsulated.

In a subsequent second step of the process according to the invention, a second crosslinking layer is formed by adding an amine which reacts at an acidic pH. Also, with stirring at a stirring speed of 500 rpm to 2000 rpm, particularly preferably at 1000 rpm to 1500 rpm, an amine which reacts at an acidic pH is added to the mixture for this purpose.

Particularly stable crosslinking is achieved if the second crosslinking with the amine reacting at an acidic pH takes place at an acidic pH of 2 to 7, preferably at a pH of 2 to 6 and most preferably at a pH of 3 to 5. For this purpose, an acid, for example formic acid or acetic acid, is added to the external aqueous phase of the mixture in order to set an appropriate pH and to avoid potential saponification of the hydrophobic active ingredients. This ensures that the pH does not drift too quickly and thus penetrate the thin and still quite labile first shell layer of protective colloid and isocyanate.

This second crosslinking layer that forms further crosslinks the capsule shell enclosing the core material, i.e., the active ingredients, and encloses it from the outside, thereby further stabilizing it.

Furthermore, this layer preferably has a hydrophobic character and encloses the internal first hydrophilic crosslinking layer, thus acting as an additional barrier layer that impedes diffusion of the enclosed active ingredient.

Even more preferably, the second crosslinking step is carried out at a temperature of 35° C. to 50° C. Preferred temperatures are from 40° C. to 45° C.

The amine reacting at an acidic pH, i.e. the second crosslinking agent, is selected from the group consisting of basic amino acids and their hydrochlorides, in particular lysine hydrochloride and/or ornithine hydrochloride, with lysine hydrochloride being particularly preferred as the crosslinking agent.

From an environmental point of view in terms of biodegradability and biocompatibility, such amino acid-based amines are particularly preferred.

Carrying out this crosslinking in an acidic pH range has the advantage over crosslinking in a basic environment that hydrophobic active ingredients with aldehyde, carboxylic acid or ester functionalities do not saponify during crosslinking with the at least one isocyanate or isothiocyanate, since the first innermost shell layer is still quite labile with regard to diffusion and similar processes. This prevents, for example, the active ingredient(s) to be encapsulated, for example a perfume oil, from being chemically altered and thus, on the one hand, a loss of the active ingredients occurs and, on the other hand, the emulsion becomes unstable. Thus, the encapsulation of hydrophobic active ingredients, in particular hydrophobic active ingredients that have an aldehyde, carboxylic acid or ester functionality, is possible.

Therefore, a preferred embodiment of the present invention relates to a process for the preparation of multilayer microcapsules comprising a second/further crosslinking step, wherein the acidic reacting amine used for crosslinking is an acidic amino acid hydrochloride, in particular lysine hydrochloride and/or ornithine hydrochloride.

In principle, however, all those basic amino acids and their hydrochlorides that have two or more amino groups are suitable for forming a second crosslinking layer, i.e., a second shell layer, in this second crosslinking step.

The amine, which reacts at an acidic pH, is added to the suspension or emulsion either directly in the form of a solid or in the form of an aqueous solution.

The amino acid hydrochloride is preferably added in the form of a 5 to 40% solution, more preferably a 10 to 20% solution.

Preferably, the second crosslinking of the process according to the invention is carried out over a period of between 5 minutes and 30 minutes with stirring, and preferably for a period of between 10 and 20 minutes.

It has been shown that after addition of the amine reacting at an acidic pH to the emulsion or suspension, a second crosslinking layer forms around the active ingredient particles or droplets already encapsulated in the first step by interfacial polymerization, which encloses the inner first capsule shell and the hydrophobic active ingredient particles or droplets contained therein. The interfacial polymerization corresponds to a polyaddition reaction of the at least one polyisocyanate or isothiocyanate (or mixtures thereof) with the amine reacting at an acidic pH, i.e. preferably with amino acid hydrochlorides, in particular lysine hydrochloride and ornithine hydrochloride, to form a crosslinked polyurea-based capsule shell.

The formation of the polyurea linkage is carried out in an analogous manner to the formation of the polyurethane linkage by polyaddition of the amine group of the amines (—NH) to the corresponding isocyanate, according to the reaction scheme below:

Reaction scheme 2

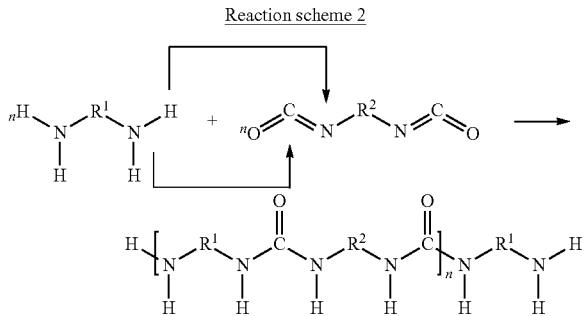

Any starch still present can be incorporated in this layer as a secondary component, which further increases the stability of the second crosslinking layer. Basically, however, this second crosslinking layer is mainly based on a polyurea-like crosslinking as the main component defining this layer.

Subsequently, a third crosslinking layer is formed around the existing material of the capsule shell or capsule wall by adding a hydroxyl group donor to form a spatially extended, primarily polyurethane-based crosslink.

By reacting the at least one isocyanate and/or isothiocyanate with the hydroxyl groups of the hydroxyl group donor, a third spatially crosslinked shell layer is formed, the structure of which can be derived in principle analogously to the first innermost crosslinked layer of polyurethane.

To obtain particularly efficient, dense and stable crosslinks, further crosslinking with the hydroxyl group donor is carried out at temperatures between 40° C. and 60° C., and preferably at temperatures between 45° C. and 55° C. even more preferably at temperatures between 45° C. and 50° C.

Furthermore, it is preferred that the step of further crosslinking is performed by adding the hydroxyl group donor at stirring speeds of from 900 rpm to 1700 rpm, preferably from 1000 rpm to 1300 rpm, and at a pH of from 5 to 9, and preferably at a pH of from 6 to 8.

The pH value required for crosslinking is adjusted by means of an organic acid, such as formic acid or acetic acid. This step is optional, however, as the pH is often already shifted into the correct range due to the preceding polymerization reaction.

In this context, it has been found that addition of the hydroxyl group donor in aqueous form leads to particularly stable crosslinkings and therefore particularly stable capsule shells or capsule walls. The concentration of the hydroxyl group donor in the aqueous solution is preferably 10% to 70% and even more preferably the concentration of the hydroxyl group donor in the aqueous solution is 40% to 60%.

Thus, the crosslinking described herein preferably results in a third defined crosslinking layer around the core comprising the at least one active ingredient to be encapsulated.

The hydroxyl group donor is preferably at least one polyol comprising two or more hydroxyl functional groups, with good to very good water solubility at temperatures above 40° C., in particular the hydroxyl group donor is selected from the group consisting of glycerol, propylene glycol and/or 1,3,5-trihydroxybenzene.

Surprisingly, it was observed that the capsules according to the invention, which have such an additional primarily polyurethane-based layer, exhibit significantly more stable properties than microcapsules without such an additional stabilizing layer. Furthermore, such multilayer microcapsules (according to the invention) show a significantly more efficient entrapment of the active ingredients.

The hydroxyl group donor is added while stirring according to the previously mentioned stirring speeds for the formation of the preceding polyurethane and polyurea-based crosslinking layers.

Thus, in a preferred embodiment, the present invention relates to a process for preparing multilayer microcapsules, wherein the hydroxyl group donor is a polyol having two or more hydroxyl functional groups, in particular glycerol, propylene glycol and/or 1,3,5-trihydroxybenzene.

Crosslinking structures of the protective colloid could also be found in this layer as a minor component.

Optionally, the present process for the preparation of multilayer microcapsules comprises a further crosslinking step by addition of an amino acid, in particular an aromatic amino acid, more preferably by addition of the amino acid histidine and/or tryptophan with stirring.

Surprisingly, it has been shown that a crosslinking layer based on an aromatic amino acid influences the diffusion of the active ingredient in such a way that it no longer diffuses through the capsule wall, which in turn leads to an additional increase in capsule stability.

Particularly advantageous results for capsule shell formation are obtained if this further (optional) crosslinking with the amino acid, i.e. an amine, is carried out at a pH of 5 to 9 and preferably at a pH of 6 to 8.

Optionally, the pH value required for crosslinking is adjusted by adding a sodium hydroxide solution.

Even more preferably, this step of further optional crosslinking is performed at a temperature of from 50° C. to 70° C., preferably from 55° C. to 65° C.

The corresponding amino acid, and in particular the aromatic amino acid, preferably has aromatic rings of five to six carbon atoms and at least one nitrogen atom in the aromatic system, as well as two or more amino groups or imine groups and is in particular histidine and/or tryptophan.

It has been shown that addition of the corresponding amino acid in aqueous form leads to particularly pronounced and strong polyurea-based crosslinking and thus contributes decisively to the stability of the resulting capsules. The concentration of the (aromatic) amino acid in the aqueous solution is preferably 10% to 70% and even more preferably 40% to 60%.

The further/additional optional crosslinking in the process according to the invention takes place during a period of about 5 minutes to 30 minutes and preferably within 10 minutes to 20 minutes at a stirring speed of 500 rpm to 2000 rpm, preferably of 1000 rpm and 1500 rpm.

Alternatively, it is possible that this additional, optional crosslinking step is carried out after the crosslinking step described below by adding at least one amine that reacts at an alkaline pH.

Thus, the invention described herein comprising a process for preparing multilayer microcapsules further comprises at least a fourth crosslinking layer by adding at least one amine reactive at an alkaline pH to obtain multilayer microcapsules with formation of a defined polyurea-based crosslinking layer around the previously described crosslinking layers. The layers may be partially interwoven. Furthermore, all layers can thus contain portions of crosslinked protective colloid.

Particularly stable capsules were obtained when this crosslinking with the amine reacting at an alkaline pH occurs at an alkaline pH of 7 to 11, and preferably at an alkaline pH of 8 to 9.

Even more preferably, the step of at least fourth crosslinking is carried out at a temperature of 60° C. to 80° C., and preferably at 65° C. to 75° C., and particularly preferably at temperatures of 60° C. to 70° C. and with stirring.

The amine reacting at an alkaline pH is preferably a guanidinium group donor and is selected from the group consisting of di-, tri- and polyamines, arginine, guanidinium hydrochloride and/or guanidinium carbonate. However, guanidinium carbonate is most preferred as a crosslinking agent for forming the at least fourth crosslinking layer.

Addition of the guanidinium group donor in aqueous form with stirring leads to the formation of particularly stable capsule shells or capsule walls. The concentration of the guanidinium group donor in the aqueous solution is preferably 1% to 50% and more preferably 10% to 25%. The stirring speed used in this process is advantageously between 500 rpm and 2000 rpm and preferably between 1000 rpm and 1500 rpm for 5 minutes to 30 minutes and preferably for 10 minutes to 20 minutes.

Preferably, the suspension or emulsion then has a pH of 7 to 8. Optionally, the pH value required for further crosslinking is adjusted, for example, by means of formic acid or acetic acid or by means of a sodium hydroxide solution.

In this sense, a preferred embodiment of the present invention relates to a process for the preparation of multilayer microcapsules comprising the formation of at least a fourth crosslinking layer, wherein the alkaline reacting amine is a guanidinium group donor, in particular arginine, guanidinium carbonate and/or guanidinium hydrochloride.

Furthermore, in a preferred embodiment, the present invention relates to a process comprising an additional optional step prior to curing in which a termination of the microcapsule crosslinking is formed by adding an amine having an amine functional group.

The amine with a functional amine group described herein is preferably a corresponding amino acid, in particular alanine, glycine, aspartic acid, cysteine and/or proline, and serves to close the last crosslinking layer and does not exhibit any spatial crosslinking but closes the network locally by incorporating the corresponding building blocks into the last outermost crosslinking layer.

The termination of the outermost crosslinking layer or microcapsule in an additional optional step prior to curing is thereby performed at a pH of 6 to 11, and preferably at a pH of 7 to 9, and optionally at a temperature above 75° C., preferably at a temperature of 75° C. to 85° C. to shorten the reaction time.

In this case, the final amines are preferably added in aqueous form at concentrations of preferably 1% to 50%, and preferably at concentrations of 10% to 25%, with stirring. Analogous to the preceding additions of the corresponding crosslinking agents, stirring is thereby carried out at 500 rpm to 2000 rpm, preferably at 1000 rpm to 1500 rpm, for between 1 and 10 minutes, or preferably for 2 to 5 minutes.

In this context, therefore, a further preferred embodiment of the present invention relates to a process according to the invention wherein the amine used in an additional optional step before curing to terminate the microcapsule is an amino acid, in particular an amino acid comprising an amino group, more preferably alanine, glycine, aspartic acid, cysteine and/or proline.

This additional step, which completes the capsule wall or shell, surprisingly leads to even more stable and efficiently confining microcapsules, while at the same time reducing the overall shell material required.

After complete crosslinking, the coated microcapsules are present as a crude microcapsule in the form of an aqueous dispersion with still soft and flexible capsule shells or capsule walls.

Following this, it is therefore necessary to subject the resulting multilayer microcapsules to an additional curing process in order to harden the still soft, flexible and unstable multilayer microcapsule shells or walls and thus give them stability. The curing after the last crosslinking or the final step of the multilayer capsules formed in this process is carried out at a temperature of about 80° C. and usually for 60 to 240 minutes. Additionally, it is advantageous to add substances to the external aqueous phase for curing. These substances are, for example, natural vegetable tanning agents.

Furthermore, it has been surprisingly shown that direct curing of the microcapsules at 80° C. compared to stepwise heating leads to more stable cassettes.

The present invention and the process described herein for producing multilayer microcapsules comprising polyurethane- and polyurea-based layers are characterized in particular by the choice of different pH ranges for carrying out the individual crosslinking steps. In combination with the gradually increasing temperature ranges, it is thus possible to produce individual and defined layers. The composition transition between the layers can be steep, i.e. the layers are materially delimited and defined to the greatest possible extent. In principle, however, the crosslinking processes described herein can also be carried out at room temperature, but result in broad gradients, lower stabilities and long reaction times.

Consequently, with the process described herein, it is possible to alternately layer defined polyurethane and polyurea-based crosslinking layers around the core comprising at least one hydrophobic active ingredient, thereby creating a stable multilayer capsule wall or capsule shell. In principle, polyurea or polyurethane linkages form the main component of the respective layers. Furthermore, the protective colloid (for example starch) can also be present in the individual layers via polyurethane linkages. Partial crosslinking between the individual alternating layers cannot be ruled out to a certain extent. Nevertheless, by means of the present method, the following layers are basically formed: a first layer comprising or consisting of polyurethane structures, a second layer comprising or consisting of polyurea structures, a third layer comprising or consisting of polyurethane structures, and at least a fourth layer comprising or consisting of polyurea structures.

In this context, the first innermost capsule layer is essentially built up from a polyurethane-based crosslinking matrix (step a), followed by an essentially polyurea-based second crosslinking layer (step b). The third layer is again preferably polyurethane-based crosslinked (step c), while the at least fourth outermost layer preferably comprises essentially a polyurea-based crosslinking system (step d). Optionally, further additional or final crosslinking layers, for example polyurea-based by crosslinking further amines, such as amino acids, are conceivable, which provide an additional gain in stability due to additional further crosslinkings.

Subsequently, the multilayered and cured microcapsules formed in this way are separated from the reaction solution and dried if necessary.

After curing, the microcapsules produced by the process according to the invention are present as a dispersion in water, which is also referred to as a microcapsule dispersion. In this form, the microcapsules are basically already ready for sale; however, for preservation purposes, it is advisable to dry them. Suitable drying processes include lyophilization or spray drying.

Furthermore, the present invention is characterized in that preferably amino acids as the main component are cross-linked with starch and isocyanates via specifically catalyzed mechanisms, thus enabling the production of biobased and biodegradable microcapsules based on biocompatible polymers.

Overall, the process described herein allows the production of microcapsules which, due to the multiple and more efficient crosslinking layers, permit significant savings in shell material and thus make it possible to further reduce the isocyanate content required compared with prior art capsules without adversely affecting the stability of the capsules. This can be justified on the one hand by the more efficient and defined crosslinking of the individual layers and on the other hand by the generally alternating/different composition of the individual capsule shell layers.

Due to the efficient spatial crosslinking, the multilayer microcapsules according to the invention thus have a significantly lower overall isocyanate content compared to prior art capsules. The absolute isocyanate content of the microcapsules described herein corresponds to only 1/50th of the total capsule comprising the active ingredient(s). In this sense, the isocyanates do not directly form a component of the capsule wall or capsule shell, but merely act as a crosslinker between, for example, the significantly larger starch molecules. Assuming that the raw materials react quantitatively, it can be assumed that, in the case of 100% wall material, exactly 1/5 of the wall material consists of isocyanates and that, due to the small quantity in which they are represented, these can only be regarded as crosslinkers.

Compared to prior art capsules based on pure polyurethane compounds, it is possible with the process described herein, comprising targeted depositions at defined temperatures and times, to produce microcapsules in which the ratio of the capsule shell to the total capsule volume could be reduced from 1 to 14 to 1 to 21 and thus the total shell material required could be significantly reduced without sacrificing stability, as illustrated in the following embodiment examples. While the proportion of capsule wall material in the prior art (pure polyurea capsule) is 6.8% by weight compared to the total capsule (capsule consisting of active ingredient and capsule wall material), in the multilayer microcapsules described herein a reduction of the capsule wall material to 4.4% by weight is possible despite additional stability gains. This corresponds to a 36% reduction in wall material. Thus, the process described herein enables the production of stable microcapsules in which the amount of capsule wall material required could be significantly reduced compared to prior art capsules, and in particular the amount of isocyanate required, while at the same time the amount of active ingredient to be encapsulated (active ingredient mixture) does not have to be reduced.

Furthermore, despite the outwardly decreasing isocyanate content and thus the outwardly decreasing degree of crosslinking, it was surprisingly possible to produce stable microcapsules that showed a significant improvement in sensory performance (fragrance compound release) compared to prior art capsules.

The protective colloid, preferably starch, can also preferably be included in each of the other defined crosslinking layers as a secondary component and incorporated into the respective polyurethane or polyurea-based network. Due to the structure of the starch, it is thus possible to generate further branched, spatially extended and further stabilized networks that interweave the layers and thus form a stable crosslinking matrix in the form of a capsule shell or capsule wall. This secondary component in the respective layers leads to better spatial crosslinking.

The protective colloid, e.g. starch, forms an essential component of the first polyurethane-like crosslinking, which is achieved by reaction with the catalyst already at a temperature of 25° C. to 40° C. The reaction of the polyol with the catalyst leads to a higher stability of the emulsion. Surprisingly, it has been shown that the further development from a polyol to a polysaccharide leads to higher stabilities while at the same time the dual function of the protective colloid as a stabilizing factor of the emulsion and as a reaction partner, for example in comparison to polyvinyl alcohol, is further improved.

As previously mentioned, the microcapsules according to the invention comprise in their core at least one active ingredient to be encapsulated as core material which preferably has hydrophobic properties.

In principle, any material suitable for inclusion in microcapsules can be used as a core material for the production of multilayer microcapsules according to the invention. Preferably, hydrophobic, water-insoluble or water-immiscible liquids or solids as well as suspensions can be considered as materials to be encapsulated. In the context of the present description, the term "hydrophobic active ingredient" means that the material to be encapsulated is in the internal non-aqueous phase and does not mix with the external aqueous phase.

In a particularly preferred further embodiment of the present invention, the microcapsules according to the invention are configured in such a way that they comprise a core material of at least one hydrophobic active ingredient, in particular a hydrophobic odiferous substance or fragrance compound or a hydrophobic scented oil or perfume oil (odiferous substance mixture or fragrance compound mixture), a pesticide, a biocide, an insecticide, a substance from the group of repellents, food additives, cosmetic active ingredients, pharmaceutical active ingredients, colorants, agrochemicals, colorants, luminous paints, optical brighteners, solvents, waxes, silicone oils, lubricants, as well as mixtures of the aforementioned active ingredients, i.e., as long as it is sufficiently water-resistant, the microcapsules according to the invention can be used in the form of a microcapsule. i.e. as long as it is sufficiently insoluble in water or does not mix with the water phase, otherwise no emulsion can form and no deposition of the polymer on the droplet surface can take place.

In a preferred variant of the present invention, hydrophobic odiferous substances or scented oils or fragrance compounds or fragrance compound mixtures (perfume oils), aromas or also biogenic principles are particularly suitable as active ingredients.

In a preferred embodiment of the present invention, the microcapsules according to the invention have a core material in the form of a hydrophobic single odiferous substance or single fragrance compound, wherein the core material comprises at least one single odiferous substance or single fragrance compound, or mixtures thereof, selected from one or more of the following groups:

hydrocarbons, such as 3-carene; a-pinene; beta-pinene; alpha-terpinene; gamma-terpinene; p-cymene; bisabolene; camphene; caryophyllene; cedrene; farnesene; limonene; longifolene; myrcene; ocimene; valencene; (E,Z)-1,3,5-undecatriene;

aliphatic alcohols, such as hexanol; octanol; 3-octanol; 2,6-dimethylheptanol; 2-methylheptanol, 2-methyloctanol; (E)-2-hexenol; (E)- and (Z)-3-hexenol; 1-octen-3-ol; mixture of 3,4,5,6,6-pentamethyl-3,4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

aliphatic aldehydes and their acetals, such as hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanaldiethyl acetal; 1,1-dimethoxy-2,2,5-trimethyl-4-hexene; citronellyloxy acetaldehyde;

aliphatic ketones and their oximes, such as 2-heptanone; 2-octanone; 3-octanone; 2-nonanone; 5-methyl-3-heptanone; 5-methyl-3-heptanone oxime; 2,4,4,7-tetramethyl-6-octen-3-one;

aliphatic sulfur-containing compounds, such as 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;

aliphatic nitriles, such as 2-nonenoic acid nitrile; 2-tridecenoic acid nitrile; 2,12-tridecenoic acid nitrile; 3,7-dimethyl-2,6-octadienoic acid nitrile; 3,7-dimethyl-6-octenoic acid nitrile;

aliphatic carboxylic acids and their esters, such as (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl 2-methyl pentanoate; ethyl hexanoate; allyl hexanoate; ethyl heptanoate; allyl heptanoate; ethyl octanoate; ethyl (E,Z)-2,4-decadienoate; methyl 2-octinate; methyl 2-noninate; allyl 2-isoamyloxyacetate; methyl 3,7-dimethyl 2,6-octadienoate;

acyclic terpene alcohols, such as citronellol; geraniol; nerol; linalool; lavadulol; nerolidol; farnesol; tetrahydrolinalool; tetrahydrogeraniol; 2,6-dimethyl-7-octen-2-al; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-l-ol; and their formates, acetates, propionates, isobutyrates, butyrates, isovalerianates, pentanoates, hexanoates, crotonates, tiglinates, 3-methyl-2-butenoates;

acyclic terpene aldehydes and ketones, such as geranial; neral; citronellal; 7-hydroxy-3,7-dimethyloctanal; 7-methoxy-3,7-dimethyloctanal; 2,6,10-trimethyl-9-undecenal; geranylacetone; and the dimethyl and diethylacetals of geranial, neral, 7-hydroxy-3,7-dimethyloctanal;

cyclic terpene alcohols, such as menthol; isopulegol; a-terpineol; terpinenol-4; menthan-8-ol; menthan-1-ol; menthan-7-ol; borneol; isoborneol; linalool oxide; nopol; cedrol; ambrinol; vetiverol; guaiaol; and their formates, acetates, propionates, isobutyrates, butyrates, isovalerianates, pentanoates, hexanoates, crotonates, tiglinates, 3-methyl-2-butenoates;

cyclic terpene aldehydes and ketones, such as menthone; isomenthone; 8-mercaptomenthan-3-one; carvone; camphor; fenchone; α-ionone; beta-ionone; α-n-methylionone; beta-n-methylionone; α-isomethylionone; beta-isomethylionone; α-iron; ß-iron; α-damascenone; beta-damascenone; gamma-damascenone; d-damascenone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; nootkatone; dihydronootkatone; α-sinene sal; beta-sinene sal; acetylated cedarwood oil (methylcedryl ketone);

cyclic alcohols, such as 4-tert-butylcyclohexanol; 3,3,5-trimethylcyclohexanol; 3-isocamphylcyclohexanol; 2,6,9-trimethyl-(Z2,Z5,E9)cyclododecatrien-1-ol; 2-isobutyl-4-methyltetrahydro-2H-pyran-4-ol; from the group of cycloaliphatic alcohols such as 3,3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

cyclic and cycloaliphatic ethers, such as cineol; cedryl methyl ether; cyclododecyl methyl ether; (ethoxymethoxy)cyclododecane; a-cedrene epoxide; 3a,6,6,9a-tetramethyldodecahydronaphtho[2,1-b]furan; 3a-ethyl-6,6,9a-trimethyl-dodecahydronaphtho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

cyclic ketones, such as 4-tert-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 9-cycloheptadecen-1-one; cyclopentadecanone; cyclohexadecanone;

cycloaliphatic aldehydes, such as 2,4-dimethyl-3-cyclohexenecarbaldehyde; 2-methyl-4-(2,2,6-trimethyl-cyclohexen-1-yl)-2-butenal; 4-(4-hydroxy-4-methylpentyl)-3-cyclohexenecarbaldehyde; 4-(4-methyl-3-penten-1-yl)-3-cyclohexenecarbaldehyde;

cycloaliphatic ketones, such as 1-(3,3-dimethylcyclohexyl)-4-penten-1-one; 1-(5,5-dimethyl-2-cyclohexen-1-yl)-4-penten-1-one; 2,3,8,8-tetramethyl-1,2,3,4,5,6,7,8-octahydro-2-naphthalenyl methyl ketone; methyl-2,6,10-trimethyl-2,5,9-cyclododecatrienyl ketone; tert-butyl-(2,4-dimethyl-3-cyclohexen-1-yl)ketone;

esters of cyclic alcohols, such as 2-tert-butylcyclohexyl acetate; 4-tert-butylcyclohexyl acetate; 2-tert-pentylcyclohexyl acetate; 4-tert-pentylcyclohexyl acetate; decahydro-2-naphthyl acetate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5- or -6-indenyl acetate; 4,7-methano-3a,4,5,6,7,7a-hexahydro-5- or -6-indenyl propionate; 4,7-methano-3a,4,5,6,7,7a-hexahydro-5- or -6-indenyl isobutyrate; 4,7-methanooctahydro-5- or -6-indenyl acetate;

esters of cycloaliphatic carboxylic acids, such as allyl 3-cyclohexyl propionate; allyl cyclohexyloxyacetate; methyl dihydrojasmonate; methyl jasmonate; methyl 2-hexyl-3-oxocyclopentanecarboxylate; ethyl 2-ethyl-6,6-dimethyl-2-cyclohexenecarboxylate; ethyl 2,3,6,6-tetramethyl-2-cyclohexenecarboxylate; ethyl 2-methyl-1,3-dioxolane-2-acetate;

aromatic hydrocarbons, such as styrene and diphenylmethane;

araliphatic alcohols, such as benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenyl-ethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

esters of araliphatic alcohols and aliphatic carboxylic acids, such as benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; α-trichloromethyl benzyl acetate; a,a-dimethylphenylethyl acetate; a,a-dimethylphenylethyl butyrate; cinnamyl acetate; 2-phenoxyethyl isobutyrate; 4-methoxybenzyl acetate;

araliphatic ethers, such as 2-phenylethyl methyl ether; 2-phenylethyl isoamyl ether; 2-phenylethyl-1-ethoxyethyl ether; phenylacetaldehyde dimethylacetal; phenylacetaldehyde diethylacetal; hydratropaaldehyde dimethylacetal; phenylacetaldehyde glycerol acetal; 2,4,6-trimethyl-4-phenyl-1,3-dioxanes; 4,4a,5,9b-tetrahydroindeno[1,2-d]-m-dioxin; 4,4a,5,9b-tetrahydro-2,4-dimethylindeno[1,2-d]-m-dioxin;

aromatic and araliphatic aldehydes, such as benzaldehyde; phenylacetaldehyde; 3-phenylpropanal; hydratropaaldehyde; 4-methylbenzaldehyde; 4-methylphenylacetaldehyde; 3-(4-ethylphenyl)-2,2-dimethylpropanal; 2-methyl-3-(4-isopropylphenyl)-propanal; 2-methyl-3-(4-tert-butylphenyl) propanal; 3-(4-tert-butylphenyl)propanal; cinnamaldehyde; a-butylcinnamaldehyde; a-amylcinnamaldehyde; a-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl) propanal; 2-methyl-3-(4-methylenedioxyphenyl)propanal;

aromatic and araliphatic ketones, such as acetophenone; 4-methylacetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; benzophenone; 1,1,2,3,6-hexamethyl-5-indanyl methyl ketone; 6-tert-butyl-1,1-dimethyl-4-indanyl methyl ketone; 1-[2,3-dihydro-1,1,2,6-tetramethyl-3-(1-methylethyl)-1H-5-indenyl]ethanone; 5',6',7',8'-tetrahydro-3',5',5', 6',8',8'-hexamethyl-2-acetonaphthone;

aromatic and araliphatic carboxylic acids and their esters, such as benzoic acid; phenylacetic acid; methyl benzoate; ethyl benzoate; hexyl benzoate; benzyl benzoate; methyl phenyl acetate; ethyl phenyl acetate; geranyl phenyl acetate; phenyl ethyl phenyl acetate; methyl cinnamate; ethyl cinnamate; benzyl cinnamate; phenyl ethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenyl ethyl salicylate; methyl 2,4-dihydroxy-3,6-dimethylbenzoate; ethyl 3-phenyl glycidate; ethyl 3-methyl-3-phenyl glycidate;

nitrogen-containing aromatic compounds, such as 2,4,6-trinitro-1,3-dimethyl-5-tert-butylbenzene; 3,5-dinitro-2,6-dimethyl-4-tert-butylacetophenone; cinnamic acid nitrile; 5-phenyl-3-methyl-2-pentenoic acid nitrile; 5-phenyl-3-methylpentanoic acid nitrile; methyl anthranilate; methyl N-methyl anthranilate; Schiff bases of methylanthranilate with 7-hydroxy-3,7-dimethyloctanal, 2-methyl-3-(4-tert-butylphenyl)propanal or 2,4-dimethyl-3-cyclohexenecarbaldehyde; 6-isopropylquinoline; 6-isobutylquinoline; 6-sec-butylquinoline; indole; scatole; 2-methoxy-3-isopropylpyrazine; 2-isobutyl-3-methoxypyrazine; 4-(4,8-dimethyl-3,7-nonadienyl)-pyridine;

phenols, phenyl ethers and phenyl esters, such as tarragol; anethole; eugenol; eugenic methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresylphenyl acetate; from the group of heterocyclic compounds such as 2,5-dimethyl-4-hydroxy-2H-furan-3-on; 2-ethyl-4-hydroxy-5-methyl-2H-furan-3-on; 3-hydroxy-2-methyl-4H-pyran-4-on; 2-ethyl-3-hydroxy-4H-pyran-4-on;

lactones, such as 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis and trans-11-pentadecene-1,15-olide; cis and trans-12-pentadecene-1,15-olide; 1,16-hexadecanolide; 9-hexadecene-1,16-olide; 10-oxa-1,16-hexadecanolide; 11-oxa-1,16-hexadecanolide; 12-oxa-1,16-hexadecanolide; ethylene-1,12-dodecanedioate; ethylene-1,13-tridecanedioate; coumarin; 2,3-dihydrocoumarin; octahydrocoumarin;

as well as the stereoisomers, enantiomers, positional isomers, diastereomers, cis/trans isomers and epimers, respectively, of the substances mentioned above.

In an alternative embodiment, scented oils or perfume oils are used as the core material or active ingredients. These are compositions containing at least one fragrance compound. Such compositions, in particular scented oils or perfume oils, preferably comprise two, three, four, five, six, seven, eight, nine, ten or more fragrance compounds. The scented oils or perfume oils are preferably selected from the group of extracts from natural raw materials, such as essential oils, concretes, absolutes, resins, resinoids, balsams, tinctures such as Ambergris oil; Amyris oil; Angelica seed oil; Angelica root oil; Anise oil; Valerian oil; Basil oil; Tree moss absolute; Bay oil; Mugwort oil; Benzoeresin; Bergamot oil; Beeswax absolute; Birch tar oil; Bitter almond oil; Savory oil; Bucco leaf oil; Cabreuva oil; Cade oil; Calmus oil; Camphor oil; Cananga oil; Cardamom oil; Cascarilla oil; Cassia oil; Cassie absolute; Castoreum absolute; Cedar leaf oil; Cedarwood oil; Cistus oil; Citronella oil; Citron oil; Copaiva balsam; Copaiva balsam oil; Coriander oil; Costus root oil; Cumin oil; Cypress oil; Davana oil; Dill herb oil; Dill seed oil; Eau de brouts absolute; Oak moss absolute; Elemi oil; Tarragon oil; Eucalyptus citriodora oil; Eucalyptus oil; Fennel oil; Spruce needle oil; Galbanum oil; Galbanum resin; Geranium oil; Grapefruit oil; Guaiac wood oil; Gurjun balsam; Gurjun balsam oil, Helichrysum absolute; Helichrysum oil; Ginger oil; Iris root absolute; Iris root oil; Jasmine absolute; Calamus oil; Chamomile oil blue; Chamomile oil Roman; Carrot seed oil; Cascarilla oil; Pine needle oil; Curly mint oil; Caraway seed oil; Labdanum oil; Labdanum absolute; Labdanum resin; Lavandin absolute; Lavandin oil; Lavender absolute; Lavender oil; Lemongrass oil; Lovage oil; Lime oil distilled; Lime oil pressed; Linal oil; Litsea cubeba oil; Bay leaf oil; Macis oil; Marjoram oil; Mandarin oil; Masso bark oil; Mimosa absolute; Musk grain oil; Musk tincture; Muscat oil; Myrrh absolu; Myrrh oil; Myrtle oil; Clove leaf oil; Clove flower oil; Neroli oil; Olibanum absolute; Olibanum oil; Opopanax oil; Orange flower absolute; Orange oil; Origanum oil; Palmarosa oil; Patchouli oil; Perilla oil; Peru balsam oil; Parsley leaf oil; Parsley seed oil; Petitgrain oil; Peppermint oil; Pepper oil; Allspice oil; Pine oil; Poley oil; Rose absolute oil; Rosewood oil; Rose oil; Rosemary oil; Sage oil Dalmatian; Sage oil Spanish; Sandalwood oil; Celery seed oil; Spic lavender oil; Star anise oil; Styrax oil; Tagetes oil; Fir needle oil; Tea tree oil; Turpentine oil; Thyme oil; Tolu balsam; Tonka absolute; Tuberose absolute; Vanilla extract; Violet leaf absolute; Verbena oil; Vetiver oil; Juniper berry oil; Wine yeast oil; Wormwood oil; Wintergreen oil; Ylang oil; Hyssop oil; Civet absolute; Cinnamon leaf oil; Cinnamon bark oil; and fractions thereof or ingredients isolated therefrom.

In a further variant of the process according to the invention, flavorings can also be encapsulated as core material in the form of a single aroma, the core material comprising at least one single flavoring or mixtures thereof as active ingredient.

Typical examples of aromas that may be encapsulated in accordance with the invention are selected from the group consisting of: acetophenone; allyl capronate; alpha-ionone; beta-ionone; nisaldehyde; anisyl acetate; anisyl formate; benzaldehyde; benzothiazole; benzyl acetate; benzyl alcohol; benzyl benzoate; beta-ionone; butyl butyrate; butyl capronate; butylidene phthalide; carvone; camphene; caryophyllene; cineole; cinnamyl acetate; citral; citronellol; citronellal; citronellyl acetate; cyclohexyl acetate; cymene; damascone; decalactone; dihydrocoumarin; dimethylanthranilate; dimethyl anthranilate; dodecalactone; ethoxyethyl acetate; ethyl butyric acid; ethyl butyrate; ethyl caprinate; ethyl capronate; ethyl crotonate; ethyl furaneol; ethyl guaiacol; ethyl isobutyrate; ethyl isovalerate; ethyl lactate; ethyl methyl butyrate; ethyl propionate; eucalyptol; eugenol; ethyl heptylate; 4-(p-hydroxyphenyl)-2-butanone; gamma-decalactone; geraniol; geranyl acetate; geranyl acetate; grapefruit aldehyde; methyl dihydrojasmonate (e.g., Hedion®); heliotropin; 2-heptanone; 3-heptanone; 4-heptanone; trans-2-heptenal; cis-4-heptenal; trans-2-hexenal; cis-3-hexenol; trans-2-hexenoic acid; trans-3-hexenoic acid; cis-2-hexenyl acetate; cis-3-hexenyl acetate; cis-3-hexenyl capronate; trans-2-hexenyl capronate; cis-3-hexenyl formate; cis-2-hexyl acetate; cis-3-hexyl acetate; trans-2-hexyl acetate; cis-3-hexyl formate; para-hydroxybenzyl acetone; isoamyl alcohol; isoamyl isovalerate; isobutyl butyrate; isobutyraldehyde; isoeugenol methyl ether; isopropyl methylthiazole; lauric acid; leavulinic acid; linalool; linalool oxide; linalyl acetate; menthol; menthofuran; methyl anthranilate; methyl butanol; methyl butyric acid; 2-methyl butyl acetate; methyl capronate; methyl cinnamate; 5-methyl furfural; 3,2,2-methylcyclopentenolone; 6,5,2-methylheptenone; methyl dihydrojasmonate; methyl jasmonate; 2-methyl methyl butyrate; 2-methyl-2-pentenolic acid; methyl thiobutyrate; 3,1-methylthiohexanol; 3-methylthiohexyl acetate; nerol; neryl acetate; trans,trans-2,4-nonadienal; 2,4-nonadienol; 2,6-nonadienol; 2,4-nonadienol; nootkatone; delta-octalactone; gamma-octalactone; 2-octanol; 3-octanol; 1,3-octenol; 1-octyl acetate; 3-octyl acetate; palmitic acid; paraldehyde; phellandrene; pentanedione; phenylethyl acetate; phenylethyl alcohol; phenylethyl alcohol; phenylethyl isovalerate; piperonal; propionaldehyde; propyl butyrate; pulegone; pulegol; sinensal; sulfurol; terpinene; terpineol; terpinolene; 8,3-thiomenthanone; 4,4,2-thiomethylpentanone; thymol; delta-undecalactone; gamma-undecalactone; valencene; valeric acid; vanillin; acetoin; ethylvanillin; ethylvanillin isobutyrate (3-ethoxy-4-isobutyryloxybenzaldehyde); 2,5-dimethyl-4-hydroxy-3(2H)-furanone and its derivatives (preferably homofuraneol (2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3(2H)-furanone); maltol and maltol derivatives (preferably ethylmaltol); coumarin and coumarin derivatives; gamma-lactones (preferably gamma-undecalactone, gamma-nonalactone, gamma-decalactone); delta-lactones (preferably 4-methyldeltadecalactone, massoilactone, deltadecalactone, tuberolactone); methyl sorbate; divanillin; 4-hydroxy-2(or 5)-ethyl-5(or 2)-methyl-3(2H)furanone; 2-hydroxy-3-methyl-2-cyclopentenone; 3-hydroxy-4,5-dimethyl-2(5H)-furanone; acetic acid isoamyl ester; butyric acid ethyl ester; butyric acid n-butyl ester; butyric acid isoamyl ester; 3-methyl butyric acid ethyl ester; n-hexanoic acid ethyl ester; n-hexanoic acid allyl ester; n-hexanoic acid n-butyl ester; n-octanoic acid ethyl ester; ethyl 3-methyl-3-phenyl glycidate; ethyl 2-trans-4-cis-decadienoate; 4-(p-hydroxyphenyl)-2-butanone; 1,1-dimethoxy-2,2,5-trimethyl-4-hexane; 2,6-dimethyl-5-heptene-1-al; phenylacetaldehyde; 2-methyl-3-(methylthio)furan; 2-methyl-3-furanthiol; bis(2-methyl-3-furyl)disulfide; furfuryl mercaptan; methional; 2-acetyl-2-thiazoline; 3-mercapto-2-pentanone; 2,5-dimethyl-3-furanthiol; 2,4,5-trimethylthiazole; 2-acetylthiazole; 2,4-dimethyl-5-ethylthiazole; 2-acetyl-1-pyrroline; 2-methyl-3-ethylpyrazine; 2-ethyl-3,5-dimethylpyrazine; 2-ethyl-3,6-dimethylpyrazine; 2,3-diethyl-5-methylpyrazine; 3-isopropyl-2-methoxypyrazine; 3-isobutyl-2-methoxypyrazine; 2-acetylpyrazine; 2-pentylpyridine; (E,E)-2,4-decadienal; (E,E)-2,4-nonadienal; (E)-2-octenal; (E)-2-nonenal; 2-undecenal; 12-methyltridecanal; 1-penten-3-one; 4-hydroxy-2,5-dimethyl-3(2H)-furanone; guaiacol; 3-hydroxy-4,5-dimethyl-2(5H)-furanone; 3-hydroxy-4-methyl-5-ethyl-2(5H)-furanone; cinnamaldehyde; cinnamalcohol; methyl salicylate; isopulegol and the stereoisomers, enantiomers, positional isomers, diastereomers, cis/trans isomers and epimers, respectively, of these substances not explicitly mentioned herein.

Most preferably, odiferous substances or fragrance compounds or flavorings are used in the preparation of the multilayer microcapsules, which are selected from the group consisting of: AGRUMEX LC; AGRUNITRIL; ALDEHYD C11 UNDECYLENIC; ALDEHYD C12 LAURIN; ALDEHYD C12 MNA; ALDEHYD C14 SOG; ALDEHYD C16 SOG.; ALLYLAMYLGLYCOLATE; ALLYLCAPRONATE; ALLYLCYCLOHEXYLPROPIONATE; ALLYLHEPTYLATE; AMBROCEN IDE® 10 TEC; AMBROCENIDE® Krist. 10% IPM; AMBROXIDE; ANETHOL NAT. EX STERNANIS; ANISALDEHYDE PURE; APRIFLOREN®; BENZYL ACETONE; BENZYL SALICYLATE; BORNEOL L/ISOBORNEOL 65/35; BUCCOBLAETTEROEL; CITRONELLOL 950; CLONAL; CYCLOHEXYL SALICYLATE; CYMOL PARA SUPRA; DAMASCONE DELTA; DIHYDROMYRCENOL; DIMETHYLBENZYLCARBINYL BUTYRATE; DYNASCONE; ETHYLENE BRASSYLATE; ETHYL METHYL BUTYRATE-2; ETHYL SAFFRONATE; EUCALYPTOL NAT.; EUCALYPTUS OIL GLOBULUS 80/85%; EUGENOL NAT.; FARENAL®; FENNEL OIL AROMA TYPE SWEET NAT.; FILBERTONE 10% IPM; FILBERTONE; FLOROPAL; GALBASCONE; GERANIOL 60; GLOBANONE®; HEDIONE; HERBAFLORATE; HERBANATE; HERBYL PROPIONATE; HEXENYL ACETATE CIS-3; HEXENYL SALICYLATE CIS-3; HEXYLACETATE; HEXYLACETATE S; HEXYL ISOBUTYRATE; HEXYL SALICYLATE; ISOAMYL BUTYRATE; ISOBORNYL ACETATE; ISOPROPYL METHYL BUTYRATE-2; ISORALDEIN 70; JAVANOL; CAMPHOR DL; CRESOL METHYL ETHER P(CR<10 PPM); LEMONILE; LIGUSTRAL; LILIAL; LINALOOL; MANZANATE; MELONAL; METHYLHEPTIN CARBONATE; METHYLOCTIN CARBONATE; MUSCENONE; NEOCYCLOCITRAL; NEROLIN BROMELIA; NEROLIN YARA YARA CRYST.; NEROLIONE; NORLIMBANOL; ORANGENOEL; ORIVONE; OZONIL; PATCHOULIOEL ENTF.; VEGETABLE OIL TRIGLYCERIDE; PHELLANDRENE FRACTION EX EUCALYPTUS OIL; PHENIRAT®; PHENYLETHYL ACETATE; ROSE OXIDE HIGH CIS; SANDRANOL®; STYRENE ACETATE; SULTANENE®; TERPINEN GAMMA; TETRAHYDROLINALOOL; TIMBERSILK; TRIETHYLCITRATE; UNDECAVERTOL; VERTOCITRAL; VERTOFIX; YSAMBER® K and mixtures of the above active ingredients.

In a further variant of the process according to the invention, biogenic principles can also be encapsulated as core material, wherein the core material comprises at least one biogenic principle or mixtures thereof.

Biogenic principles are active ingredients with biological activity, for example tocopherol, tocopherol acetate, tocopherol palmitate, ascorbic acid, carnotine, carnosine, caffeine, (deoxy)ribonucleic acid and its fragmentation products, β-glucans, retinol, bisabolol, allantoin, phytantriol, panthenol, AHA acids, amino acids, ceramides, pseudoceramides, essential oils, plant extracts, and vitamin complexes.

In a particularly preferred embodiment, the present invention therefore relates to a process for the production of multilayer microcapsules, wherein the at least one, preferably hydrophobic, active ingredient to be encapsulated is selected from the group consisting of fragrance compounds, odiferous substances, flavorings, biocides, insecticides, a substance from the group of repellents, food additives, cosmetic active ingredients, pharmaceutical active ingredients, agrochemicals, colorants, luminous colors, optical brighteners, solvents, waxes, silicone oils, lubricants, as well as mixtures of the aforementioned active ingredients, particularly preferably the active ingredient is a fragrance compound or a fragrance compound mixture and is therefore preferably a hydrophobic odiferous substance or fragrance compound or a hydrophobic odiferous substance or fragrance compound mixture.

Such microcapsules are characterized by excellent stability and release capacity. In the case of fragrance compounds as the active ingredient (core material), the multilayer microcapsules produced in this way also exhibit excellent sensory properties, which can be attributed to the stable active ingredient encapsulation and the associated low active ingredient losses. A particularly defined and good sequence of process steps leads to these defined, dense and very thin capsule shells or capsule walls, which as a quartet synergistically account for the very good sensory performance of the capsules. Furthermore, due to the different chemical properties of the selected crosslinkers, particularly thin capsule walls or capsule shells can be produced, which nevertheless lead to the analytical stability being maintained (active ingredient in capsule) and the sensory performance being further improved.

Surprisingly, it was found that corresponding fragrance compound capsules produced by the method of the invention exhibit a higher stability and a reduction of unintentionally escaping perfume oil, which can be attributed in particular to a more efficient encapsulation of the fragrance compounds. Capsules produced in this way therefore exhibit a significantly higher odor intensity when scent is released by opening the capsules by means of mechanical friction or by pressure.

Thus, another object of the present invention relates to multilayer microcapsules comprising at least one hydrophobic odiferous substance or fragrance compound prepared by a process described herein.

As previously explained, such microcapsules comprising multilayer capsule shells or capsule walls have particularly good active ingredient release properties, while at the same time having a significantly lower polymer content (capsule wall components). At the same time, there are no restrictions against individual fragrance compounds. This means that a universal capsule is available which, according to the current status, can encapsulate many or even every odiferous substance or fragrance compound tested.

An additional aspect of the present invention relates to multilayer microcapsules comprising a core comprising at least one hydrophobic odiferous substance or fragrance compound, and a capsule shell, wherein the capsule shell comprises or consists of, from the inside out:
(v) a first layer comprising or consisting of polyurethane;
(vi) a second layer comprising or consisting of polyurea;
(vii) a third layer comprising or consisting of polyurethane; and
(viii) at least a fourth layer comprising or consisting of polyurea.

The alternating crosslinking of isocyanate units with amines or hydroxyl groups results in a stable capsule wall of alternating defined and dense and thus stable layers primarily based on polyurethane and polyurea.

Surprisingly, it was found that the microcapsules produced by the process of the invention have a multilayer capsule shell that basically comprises a first innermost polyurethane-based layer, a second polyurea-based layer, a third polyurethane-based layer, and at least a fourth outermost polyurea-based layer.

As indicated previously, the first, innermost barrier layer is formed primarily by crosslinking of the at least one isocyanate and the protective colloid, for example a polysaccharide. The second crosslinking step results primarily from polyaddition of isocyanates and the acidic reacting amine, for example an amino acid, while the third crosslinking layer results primarily from a reaction of isocyanates and the hydroxyl group donor. Finally, the capsule is enveloped by at least a fourth crosslinking layer formed primarily by the reaction of isocyanates and at least one basic reacting amine. Thus, the multilayer microcapsule according to the invention generally has an alternating shell system based on polyurethane and polyurea linkages, which gives the capsules a particularly high stability.

By building up the capsule wall based on several individual defined and alternating layers, which are formed by targeted deposition at defined temperatures and times and which support and enclose each other, it is possible, based on the present invention, to produce particularly stable microcapsules with excellent sensory performance while at the same time significantly reducing the shell components.

In another preferred embodiment, the present invention therefore relates to multilayer microcapsules, wherein:
(i) the first layer comprises crosslinked units of at least one isocyanate having two or more isocyanate groups and a protective colloid;
(ii) the second layer comprises crosslinked units of at least one isocyanate having two or more isocyanate groups and an amine which reacts at an acidic pH;
(iii) the third layer comprises crosslinked units of at least one isocyanate having two or more isocyanate groups and a hydroxyl group donor; and
(iv) the at least fourth layer comprises crosslinked units of at least one isocyanate having two or more isocyanate groups and at least one amine which reacts at an alkaline pH.

Surprisingly, the microcapsules described herein have been shown to have higher stabilities and exhibit excellent sensory properties (excellent microcapsule release capacity), while overall less shell material was required compared to comparably stable prior art capsules, as illustrated in the following embodiments. Thus, the present invention enables, for example, the provision of efficient fragrancing system and flavoring systems through efficient encapsulation of hydrophobic odiferous substances and fragrance compounds.

Furthermore, it is possible to encapsulate a broad spectrum of hydrophobic active ingredients with the microcapsules described herein. This means that there are no longer any restrictions on individual active ingredients such as fragrance compounds. This means that a universal capsule is available which, according to the current state of the art, can encapsulate most of the fragrance compounds tested.

It is particularly advantageous in the context of the present invention to use biodegradable fragrance compounds or odiferous substances or fragrance compound mixtures or odiferous substance mixtures to achieve a fully biodegradable product.

In a particularly preferred embodiment of the present invention, multilayer microcapsules are therefore described, wherein the multilayer microcapsule comprises at least one biobased and biodegradable odiferous substance or fragrance compound or an odiferous substance mixture or fragrance compound mixture.

The choice of defined temperature ranges for the addition of the individual reactants also leads to a completely new separation mechanism compared to the state of the art. This has several advantages, such as increased stability of the emulsion. By selectively adding the reactants at defined temperatures, no peaks in pH in the direction of alkaline or acidic pH values are generated. In the present process, the pH values used or resulting after the individual crosslinking steps are generally in a range between 3 and 9, while the end product is almost neutral with a pH between 7 and 8. This is reflected in the exceptionally good stabilities—despite significantly reduced capsule wall material (polymer content)—and the excellent active ingredient releases of the microcapsules produced.

The microcapsules produced by the process of the invention can be characterized by the d(0.5) value of their size distribution, i.e. 50% of the capsules produced are larger, 50% of the capsules are smaller than this value.

To determine the particle size, the microcapsules of the invention are dispersed in water as part of a dynamic process and the particle size is then determined by laser diffraction. Depending on the size of the capsule, the laser beam is refracted differently and can thus be converted to a size. Mie theory was used for this purpose. A MALVERN Mastersizer 3000 was used for the particle measurement.

The microcapsules according to the invention are characterized by having a particle size distribution at a d(0.5)-value of 10 µm to 100 µm, preferably a d(0.5)-value of 20 µm to 65 µm. The corresponding particle size distributions of microcapsules according to the invention and microcapsules of the prior art, i.e. microcapsules based on a pure polyurea network, are illustrated in FIG. 6. The direct comparison of the microcapsules shows that due to an improved emulsification process as described herein, a more homogeneous distribution in particle size of the microcapsules can be achieved compared to prior art microcapsules.

FIG. 5 shows the IR images of the microcapsules according to the invention and of prior art microcapsules. The prior art capsules correspond to microcapsules produced by known encapsulation technology and based on a pure polyurea-based network. No catalyst was used to produce such microcapsules and polyvinyl alcohol was chosen as the protective colloid. The production was also carried out at a pH of 9. On the basis of the graph, clear differences in the bands can be seen, particularly in the fingerprint area. Due to the significantly more intense band at 626 cm$^{-1}$ of the multilayer microcapsules compared to the prior art, it can be concluded that there is an asymmetric stretching vibration of an OH group, which can be attributed to the modified starch used, for example. Another example is the band at 510 cm$^{-1}$, which can be assigned to an N-H vibration of a polyurethane. The comparison of the IR spectra shows that, compared with prior art capsules (pure polyurea-based capsules), a new additional polymer has formed to which the improved stabilities and sensory properties can be attributed (polyurethane crosslinks).

Due to their stability and the targeted release of the active ingredients, the microcapsules according to the invention are suitable for a wide range of applications and in particular for use in detergents, fabric softeners, cleaning agents, scent boosters in liquid or solid form, cosmetics, personal care products, agricultural products or pharmaceutical products and the like.

In another aspect of the invention, the use of the multilayer microcapsule or a suspension of multilayer microcapsules for the manufacture of detergents, fabric softeners, cleaning agents, scent boosters or fragrance enhancers in liquid or solid form, cosmetics, personal care products, agricultural products or pharmaceutical products is also described.

Design Examples

The multilayer microcapsules according to the invention and their advantageous properties are described in more detail with reference to the following examples.

The stability tests listed below were carried out at 50° C.

The prior art capsules chosen were generally capsules whose capsule walls were exclusively due to a polyurea network. No catalyst was generally used in the production of these capsules and the synthesis was carried out at a pH of 9. Polyvinyl alcohol was chosen as the protective colloid.

Example 1: Stability Data of Multilayer Microcapsules Produced by the Method of the Invention with Comparative Capsules; General Stability Gain In a first example, the stability data of multilayer microcapsules prepared according to the invention are compared with the stability data of corresponding microcapsules prepared without the addition of a catalyst. For the preparation of the latter, a mixture of two different isocyanates of hexamethylene diisocyanate and 4,4'-methyldiphenylene diisocyanate in a ratio of 80:20, modified starch as a protective colloid, and the crosslinkers lysine hydrochloride (amine reacting at an acidic pH), glycerol (hydroxyl group donor) and guanidinium carbonate (amine reacting at an alkaline pH) were used. No catalyst was used in the preparation of these capsules.

The multilayer microcapsules of the invention were prepared from a mixture of two different isocyanates of hexamethylene diisocyanate and 4,4'-methyldiphenylene diisocyanate in a ratio of 80:20, modified starch as protective colloid, the catalyst DABCO, and the crosslinkers lysine hydrochloride (amine reacting at an acidic pH), glycerol (hydroxyl group donor) and guanidinium carbonate (amine reacting at an alkaline pH) according to the following scheme:

TABLE 1

Fabrication of the multilayer microcapsules using the process described herein.

| Step | |
|---|---|
| 1 | Dissolving the isocyanates in the hydrophobic phase |
| 2 | Dissolving the starch in water |
| 3 | Emulsion formation |
| 4 | Addition of DABCO at 25° C. |

TABLE 1-continued

Fabrication of the multilayer microcapsules using the process described herein.

| Step | |
|---|---|
| 5 | Addition of lysine hydrochloride at 40° C. |
| 6 | Addition of glycerol at 50° C. |
| 7 | Addition of guanidinium carbonate solution at 60° C. |

Both capsules included perfume oil Tom Cap.

The starch used in the examples herein as a protective colloid and crosslinking agent is usually in the form of a succinate. For this purpose, the starch is derivatized with succinic acid.

The stability test was performed using a representative softener (fabric softener) in which the corresponding microcapsules were incorporated in an amount of 1% by weight. The softener was then stored at a temperature of 50° C. for the periods indicated below (see Table 1).

TABLE 2

Stability data of multilayer microcapsules according to the invention compared to the stability data of reference capsules prepared without the use of a catalyst.

| with/without catalyst | Free perfume oil | After 3 days at 50° C. | After 10 days at 50° C. |
|---|---|---|---|
| WITHOUT | 1.13% | 46% | 40% |
| WITH | 0.02% | 88% | 85% |

The stability of the microcapsules is determined by the residual oil content (the perfume oil remaining in the microcapsule). From a content of more than 40% residual oil after 10 days, the microcapsules produced are considered stable.

The capsule contents after several days were analyzed by GC/MS (gas chromatography with mass spectrometry coupling). The perfume oil content in the capsules was determined by comparison measurement with a standard. A result of 46%, for example, means that 64% of the amount of perfume oil originally used is no longer included in the capsule.

The determination of the free oil immediately after their production, i.e. of oil escaping from the capsules, was carried out by placing the microcapsules in isopropanol and was determined after 30 seconds by means of solid phase microextraction (SPME) and then by GC/MS and is regarded as a measure of the quality of the capsules. i.e., the escaped free perfume oil is determined via gas chromatographic measurements with a standard. The proportion of perfume oil still contained can be calculated in reverse. The capsules tested were found to be stable up to a level of less than 1% of leaked free oil. It has been shown that fresh microcapsules produced by the process according to the invention leak significantly less perfume oil than the comparative capsules and therefore exhibit a higher level of quality.

This example clearly shows that the use of a catalyst significantly influences the capsule stability and that significantly more stable multilayer microcapsules can be produced by using a catalyst. In the comparative capsules, produced without the use of a catalyst, no first innermost capsule shell based on polyurethane can form (see reaction scheme 1), resulting in an overall lower stability of the capsule wall due to the lower number of crosslinking layers. Furthermore, it should be noted in this context that the catalyst was added at room temperature and that this first innermost crosslinking layer based on polyurethane already forms efficiently at room temperature.

Example 2: Stability Data of Multilayer Microcapsules Prepared by the Method of the Invention, With and Without Hydroxyl Group Donor In a second example, the stability data of multilayer microcapsules prepared according to the invention are compared with the stability data of corresponding microcapsules prepared without the addition of a hydroxyl group donor, i.e., microcapsules without the additional polyurethane-based third capsule shell layer.

For the preparation of the latter, a mixture of two different isocyanates of hexamethylene diisocyanate and 4,4'-methyldiphenylene diisocyanate in a ratio of 80:20, polyvinyl alcohol (PVOH) as protective colloid, the catalyst DABCO, and the crosslinkers lysine hydrochloride (amine reacting at an acidic pH) and guanidinium carbonate (amine reacting at an alkaline pH) were used. No hydroxyl group donor was used in the manufacture of these capsules.

The multilayer microcapsules of the invention were prepared from a mixture of two different isocyanates of hexamethylene diisocyanate and 4,4'-methyldiphenylene diisocyanate in a ratio of 80:20, starch as protective colloid, the catalyst DABCO, and the crosslinkers lysine hydrochloride (amine reacting at an acidic pH), glycerol (hydroxyl group donor) and guanidinium carbonate (amine reacting at an alkaline pH) [see Example 1].

TABLE 3

Stability data of multilayer microcapsules according to the invention with and without additional polyurethane-based crosslinking layer by addition of a hydroxyl group donor (with/without addition of a hydroxyl group donor).

| with/without hydroxyl group donor | Free perfume oil | After 3 days at 50° C. | After 10 days at 50° C. |
|---|---|---|---|
| WITHOUT | 0.33% | 71% | 64% |
| WITH | 0.02% | 88% | 85% |

The stability was determined as described in Example 1.

In general, all microcapsules show good stability. With the additional use of a hydroxyl group donor, better stabilities could be achieved, which can be attributed to the formation of an additional third polyurethane-based shell layer. Surprisingly, this further development of the process and the more targeted deposition of the individual shells lead to a high gain in stability.

Example 3: Stability Data of Multilayer Microcapsules Prepared by the Method According to the Invention as a Function of the Time of Catalyst Addition In another example, the stability data of the multilayer microcapsules prepared according to the invention are compared with the stability data of corresponding microcapsules in which the catalyst was already added in the aqueous phase (i.e., in step a2).

The multilayer microcapsules of the invention were prepared from a mixture of two different isocyanates of hexamethylene diisocyanate and 4,4'-methyldiphenylene diisocyanate in a ratio of 80:20, starch as protective colloid, the catalyst DABCO, and the crosslinkers lysine hydrochloride (amine reacting at an acidic pH), glycerol (hydroxyl group donor) and guanidinium carbonate (amine reacting at an alkaline pH) according to the scheme in Example 1. In the comparative capsules, the addition of the catalyst occurred prior to emulsification, whereas in the multilayer microcapsules according to the process described herein, the addition of the catalyst occurred after emulsification of the aqueous and internal non-aqueous phases.

Both capsules, the multilayer microcapsule according to the invention produced by the method described herein and the reference capsule have an average particle size distribution of d(0.5)>60 µm.

TABLE 4

Stability data of multilayer microcapsules according to the invention as a function of the time of catalyst addition.

| Timing of the DABCO addition | Free perfume oil | 3 days 50° C. | 10 days 50° C. |
|---|---|---|---|
| in the water phase | 0.18% | 61% | 52% |
| after emulsification | 0.06% | 84% | 77% |

The stability was determined as described in Example 1.

Compared to the reference capsules, the microcapsules according to the invention, in which the catalyst was added after emulsification and not already in the aqueous phase, show a significantly higher stability, even after 10 days at 50° C., and a significant reduction of the free perfume oil. This corresponds to an increase in stability by a factor of 3.

In the case of the multilayer microcapsules prepared by the method described herein, the resulting shell material was 40% of the shell material of the microcapsules with hydroxyl group donor of Example 2. Despite the reduced amount of shell material required, by means of the method of the invention, multilayer microcapsules can be obtained which exhibit excellent stabilities.

Example 4: Sensory Evaluation of the Microcapsules According to the Invention

Sensory evaluation of the microcapsules was performed as follows: The microcapsules, as listed in FIG. 7, were incorporated into a fabric softener and then washed. Rinsing was carried out on mixed fiber cloths made of cotton and polyester.

Both the capsules of the prior art (pure polyurea-based capsules) and the microcapsules according to the invention contain the perfume oil TomCap. The prior art capsules were manufactured exclusively by polyurea crosslinking. No catalyst was used for the production and polyvinyl alcohol was chosen as the protective colloid. The production was carried out at a pH of 9. Such capsules thus exhibit a pure polyurea-based shell network. The multilayer microcapsules according to the invention were prepared as described in Example 1.

12 test subjects rated the odor intensity of the mixed fiber wipes after washing on a scale of 1 (no odor) to 9 (very strong odor).

The microcapsules according to the invention have effectively the same odor profile as the microcapsules from the prior art. However, the test subjects were able to perceive a significantly higher odor intensity on average for the untreated, the kneaded and the rubbed mixed-fiber wipes. In this case, the scent is released by mechanical destruction of the microcapsules of the invention. The advantage is due to the stability of the microcapsules according to the invention.

Another major advantage of isocyanate-based encapsulations is the fact that these capsules are formaldehyde-free. Furthermore, compared to the state of the art, a gain in stability and sensory performance can be observed despite significantly lower polymer amounts. This can be explained on the basis of the thin multilayer capsule shells. At the same time, there are no restrictions against individual fragrance compounds. This means that an almost universal capsule is available which, according to the current state of the art, can encapsulate almost any fragrance compound tested.

The prior art microcapsules lose oil more rapidly over time and thus have a less intense odor than the microcapsules of the invention.

Example 5: Influence of the Selected Isocyanates on the Stability of Multilayer Microcapsules according to the Invention The multilayer microcapsules of the invention were prepared according to Example 1, with arginine being used instead of guanidinium carbonate. Thus, the microcapsules were prepared from a mixture of two different isocyanates or else from an isocyanate according to the following table, starch as protective colloid, the catalyst DABCO, and the crosslinkers lysine hydrochloride (amine reacting at an acidic pH), glycerol (hydroxyl group donor) and arginine (amine reacting at an alkaline pH).

The following table shows the direct comparison of the influence of the isocyanates selected for the production of the multilayer microcapsules according to the invention on the stability of said microcapsules. Light microscope images of the corresponding microcapsules according to the invention are given in FIGS. 1 to 4.

TABLE 5

Comparison of the influence of the selected isocyanates on the stability of the multilayer microcapsules according to the invention.

| Selected isocyanates | Free perfume oil |
|---|---|
| 100% proportion of longer-chain diisocyanate | 0.57% |
| 100% content of shorter-chain diisocyanate | 0.94% |
| 50% longer-chain and 50% shorter-chain diisocyanate (50:50 mixture) | 0.32% |
| 80% proportion of longer-chain diisocyanate and 20% proportion of aromatic diisocyanate | 0.46% |

The stability was determined as described in Example 1.

In the example described herein, hexamethylene diisocyanate was selected as the longer chain diisocyanate; pentamethylene diisocyanate was selected as the shorter chain diisocyanate; and 4,4'-methyldiphenylene diisocyanate was selected as the aromatic diisocyanate.

It has been shown that the use of longer-chain aliphatic diisocyanates is generally preferable, since less free oil escapes. Even more preferable, however, is the choice of two different diisocyanates and, in particular, of mixed longer-chain and short-chain aliphatic diisocyanates or mixed aliphatic and aromatic isocyanates. This leads to particularly stable and better, i.e., more densely branched, cross-links within the capsule shell, which has a positive effect on the stability of the capsules. Furthermore, due to the different diffusive properties of the isocyanates, the high reaction rates underlying the isocyanates are exploited here during synthesis. Nevertheless, it is surprising in this case that already one carbon atom more or less causes a decisive difference in the reaction rate. A clear difference can therefore be observed when OCN-(C5 chain)-NCO or OCN-(C6 chain)-NCO is used.

Example 6: Influence of Hydroxyl Group Donor and Catalyst on Microcapsule Stability In another example, the stabilities of multilayer microcapsules prepared according to the invention are compared with microcapsules prepared without a hydroxyl group donor and/or a catalyst.

The multilayer microcapsules of the invention were prepared from a mixture of two different diisocyanates/diisothiocyanates (mixture of hexamethylene diisocyanate and 4,4'-methyldiphenylene diisocyanate in a ratio of 80:20) with the same functionalities. In the present example, emulsion formation takes place at 25° C. Modified starch was chosen as the protective colloid and the crosslinkers were lysine hydrochloride (amine reacting at an acidic pH), glycerol (hydroxyl group donor) and guanidinium carbonate (amine reacting at an alkaline pH). The microcapsules were prepared as in the manufacturing process described herein according to Example 1.

TABLE 6

Stability data of multilayer microcapsules according to the invention depending on the influence of the hydroxyl group donor and the catalyst.

| Feature | 3 days 50° C. | 10 days 50° C. |
|---|---|---|
| Without glycerin and without catalyst | 64% | 57% |
| Without glycerin and with catalyst | 70% | 61% |
| With glycerin and without catalyst | 46% | 40% |
| With glycerin and with catalyst | 88% | 85% |

The stability was determined as described in Example 1.

It can be seen from the above table that the use of a catalyst leads to significantly more stable capsules. After addition of the catalyst to the emulsion or suspension, a crosslinked polyurethane-based capsule shell forms at the interfaces of the emulsified or suspended active ingredient particles or droplets to be encapsulated as a result of polyaddition reactions of the diisocyanate/diisothiocyanate mixture with the modified starch. In the absence of the catalyst, such a crosslinked layer cannot form and the starch acts only as a protective colloid and not additionally as a crosslinker. Therefore, the addition of a catalyst effectively causes the formation of the (additional) polyurethane-based shell layer, which contributes decisively to the stability of the resulting microcapsules.

Furthermore, it can be inferred from this experiment that crosslinking by the addition of an additional hydroxyl group donor, in this case glycerol, also contributes decisively to the overall stability of the microcapsules thus produced. The polyaddition reaction of the diisocyanate/diisothiocyanate mixture with the hydroxyl group donor forms an additional polyurea-based crosslinking layer, which gives the microcapsules additional stability.

In this sense, microcapsules according to the invention with an additional polyurethane-based and an additional polyurea-based capsule shell show the best stability properties. The microcapsules thus produced have a multilayer capsule wall of generally alternately crosslinked polyurethane and polyurea-based layers in the following order: first innermost layer comprising polyurethane structures, second layer comprising polyurea structures, third layer comprising polyurethane structures, and fourth outermost layer comprising polyurea structures.

Example 7: Influence of the Selected Temperature Ranges

In the following experiment, the influence of the temperature staging of the individual steps a) to d) is shown on the basis of microcapsules according to the invention and prior art capsules (pure polyurea-based capsules produced without catalyst at a pH of 9 using polyvinyl alcohol as protective colloid). The addition of all reactants was carried out at room temperature in the prior art example.

For the preparation of the microcapsules according to the invention, the following temperature ranges were selected for the addition of the individual components (The reactants were added as described in the present invention):

addition of catalyst DABCO: 22 to 26° C. (step a4);
addition of the amine (lysine hydrochloride) reacting at an acidic pH: 40 to 45° C. (step b);
addition of the hydroxyl group donor (glycerol): at 45 to 50° C. (step c);
addition of the amine (guanidinium carbonate) reacting at an alkaline pH: 60 to 70° C. (step d).

TABLE 7

Stability data and polymer proportions of prior art multilayer microcapsules and capsules according to the invention.

| Capsule | Polymer content capsule | 3 days 50° C | 10 days 50° C. |
|---|---|---|---|
| State of the art | 6.8 % by weight | 81% | 75% |
| According to the invention | 4.4% by weight | 84% | 77% |

The stability was determined as described in Example 1.
The composition of the capsule wall components can ideally be described as follows:

TABLE 8

Composition of the multilayer capsule shell or capsule wall

| Reactand | Share in [% by weight] |
|---|---|
| Lysine Hydrochloride | 0.6 |
| Glycerin | 1.2 |
| Guanidinium Carbonate | 0.4 |
| Isocyanates (hexamethylene diisocyanate and 4,4'-methyldiphenylene diisocyanate in the ratio 80:20) | 1.9 |
| Modified starch | 0.3 |

Despite the lower polymer content, the microcapsules according to the invention show comparably good, if not even better stability data. On the one hand, the improved stability can be attributed to the four-layer shell system. On the other hand, the specifically selected temperatures result in more efficient crosslinking of the crosslinking building blocks and thus enable a reduction in the overall polymer content required.

Example 8: Stability Data of Microcapsules According to the Invention with Reduced Shell Content The multilayer microcapsules of the invention were prepared from a mixture of two different isocyanates (mixture of hexamethylene diisocyanate and 4,4'-methyldiphenylene diisocyanate in a ratio of 80:20), starch as a protective colloid, the catalyst DABCO (added at 22° C. to 26° C.), and the crosslinkers lysine hydrochloride (amine reacting at an acidic pH; added at 40° C. to 45° C.), glycerol (hydroxyl group donor; added at 45° C. to 50° C.) and guanidinium carbonate (amine reacting at an alkaline pH; added at 60° C. to 70° C.). The microcapsules thus produced according to the invention thus have a capsule wall comprising basically four different polyurethane- and polyurea-based crosslinking layers in an alternating sequence.

The capsules of the prior art are ordinary capsules with single-layer capsule walls based on pure polyurea from a mixture of hexamethylene diisocyanate and 4,4'-methyldiphenylene diisocyanate in the ratio 80:20 and guanidinium carbonate. These capsules were produced without the use of a catalyst at a pH of 9 using polyvinyl alcohol as a protective colloid.

TABLE 9

Polymer proportions and stability data of multilayer microcapsules according to the invention and of prior art capsules.

| Capsule | Polymer content capsule | 3 days 50° C. | 10 days 50° C. |
| --- | --- | --- | --- |
| State of the art | 6.8 % by weight | 81% | 75% |
| According to invention 1 | 4.4% by weight | 84% | 77% |
| According to invention 2 | 2.2% by weight | 58% | 50% |
| According to invention 3 | 1.1% by weight | 59% | 47% |
| According to invention 4 | 0.6% by weight | 32% | 24% |

The stability was determined as described in Example 1.

The increased number of individual layers results in a stable capsule with a reduced amount of polymer, which is more stable despite 36% less polymer (comparison of prior art to Invention 1) and even with a fraction of the polymer amount of 16% of the initial amount (Invention 3) still stably encloses almost 50% of the oil in the capsule after 10 days at 50° C. in its interior.

Example 9: Stability Data of Microcapsules According to the Invention as a Function of the pH Value Used with Respect to the Formation of the First Innermost Crosslinking of the Capsule Shell or Capsule Wall of Isocyanate and Protective Colloid The microcapsules studied were prepared according to the process described herein. The isocyanate component was composed of a mixture of hexamethylene diisocyanate and 4,4'-methyldiphenylene diisocyanate in a ratio of 80:20. DABCO acted as catalyst, while starch was used as protective colloid (see Example 1).

TABLE 10

Stability data of the multilayer microcapsules as a function of pH of the first polymerization with starch.

| pH value of the emulsion | free oil |
| --- | --- |
| 3 | unstable emulsion |
| 5 | unstable emulsion |

TABLE 10-continued

Stability data of the multilayer microcapsules as a function of pH of the first polymerization with starch.

| pH value of the emulsion | free oil |
| --- | --- |
| 7 (start area) | 0.35% |
| 9 (start area) | 0.23% |
| 11 | 6.16% |

The stability was determined as described in Example 1.

The experiment described herein shows that capsules which have an inner polyurethane-based capsule shell of starch and isocyanates exhibit particularly stable properties when this first polymerization, i.e. the formation of the innermost capsule shell, takes place at a pH of 7 to 9. Furthermore, it was surprisingly shown that the modified starch used could be used in a dual function simultaneously as a protective colloid and as a reactant (capsule wall component/crosslinker).

Example 10: Optional Step Prior to Curing in which a Termination of Microcapsule Crosslinking is Formed by Adding an Amine with an Amine Functional Group The studied microcapsules were prepared according to the procedure described herein. The following reactants were used for this purpose: Two linear isocyanates hexamethylene diisocyanate and pentamethylene diisocyanate in a ratio of 90:10, DABCO as catalyst (addition at 25° C.), lysine hydrochloride (addition at 40° C., glycerol (addition at 50° C.) and arginine (addition at 60° C.), and the amines histidine or alanine (addition at 80° C.). The latter amines are amino acids comprising an amino group.

TABLE 11

Stability data of multilayer microcapsules comprising final additional crosslinking.

| Capsule with arginine according to the invention | free oil |
| --- | --- |
| Without optional step before hardening | 0.87% |
| Additional crosslinking with histidine | 0.45% |
| Additional crosslinking with alanine | 0.63% |

The stability was determined as described in Example 1.

The example described herein clearly demonstrates that the additional optional step of crosslinking with an amine, preferably an amino acid with a functional group leads to additional stabilization of the capsule.

Example 11: Stability Data of Multilayer Microcapsules and the Influence of Protective Colloid and Hydroxyl Group Donor on the Stability of Multilayer Microcapsules In another example, the stabilities of multilayer microcapsules produced according to the invention are shown as a function of the protective colloid (with/without PVOH or modified starch) and the hydroxyl group donor (with/without glycerol or phloroglucin).

The synthesis of the microcapsules according to the invention was basically as described in Example 1, with variations according to the following tables. The microcapsules of the prior art are pure polyurea-based microcapsules. Here, the individual components were added to the reaction mixture or suspension or emulsion within defined temperature ranges. The prior art capsule is a microcapsule based on a pure polyurea network. In the production of these capsules, no catalyst was generally used and the synthesis was carried out at a pH of 9. Polyvinyl alcohol was selected as the protective colloid.

TABLE 12

Stability data of multilayer microcapsules according to the invention as a function of the influence of the hydroxyl group donor and the protective colloid.

| Capsule | 3 days 50° C. | 10 days 50° C. |
|---|---|---|
| State of the art capsule [with PVOH and without glycerol]. | 77% | 70% |
| Capsule according to the invention with PVOH and without glycerol | 70% | 61% |
| Capsule according to the invention with ammonium derivative of PVOH and without glycerol. | 41% | 33% |
| Capsule according to the invention with ammonium derivative of PVOH and with glycerol. | 55% | 49% |
| Capsule according to the invention with modified starch and without glycerol | 76% | 67% |
| Capsule according to the invention with modified starch and with glycerol | 88% | 85% |

The stability was determined as described in Example 1.

The choice of different temperature ranges for the addition of the individual reactants also leads to a completely new separation mechanism compared with the prior art, due to which increased stability of the emulsion can be achieved, since no peaks in the pH value in the direction of alkaline or acidic pH values are generated by selective addition of the reactants at defined temperatures. In the present process, the pH values used or resulting after the individual crosslinking steps are generally in a range between 3 and 9, while the end product is almost neutral with a pH value between 7 and 8.

It can be seen from the above table that an increase in hydroxyl groups both in the protective colloid and by adding a hydroxyl group donor, in this case glycerol, leads to a significant increase in the stability of the capsules. This leads to the fact that the capsules according to the invention, produced with modified starch and with glycerol, show the best stabilities.

TABLE 13

Stability data of multilayer microcapsules according to the invention as a function of the influence of the hydroxyl group donor and the protective colloid.

| Capsule | 3 days 50° C. | 10 days 50° C. |
|---|---|---|
| State of the art capsule [with PVOH and without glycerin]. | 77% | 70% |
| Modified starch capsule according to the invention without hydroxyl group donor | 76% | 67% |
| Capsule according to the invention with modified starch and with glycerol | 88% | 85% |
| Capsule with ammonium derivative of PVOH and with phloroglucin | 50% | 47% |
| Capsule with modified starch and with phloroglucin | NO CAPSULES | |

The stability was determined as described in Example 1.

The table shows that in contrast to a combination of modified starch and glycerol, a comparable system with phloroglucin (1,3,5-trihydroxybenzene) gives worse results. Surprisingly, not every polyol seems to allow these high stability gains, so as expected reactive triphenol, such as phloroglucin as hydroxyl group donor, with modified starch does not even lead to the formation of microcapsules. Preferably, therefore, the hydroxyl group donor is a polyol with two or more functional hydroxyl groups, in particular glycerol and/or propylene glycol.

The invention claimed is:

1. A method for producing multilayer microcapsules comprising the following steps in this order:
    a) forming a first crosslinking layer by:
        a1) providing an internal non-aqueous phase comprising at least one isocyanate having two or more isocyanate groups and at least one active ingredient to be encapsulated;
        a2) providing an external aqueous phase comprising at least one protective colloid;
        a3) mixing the internal non-aqueous phase and the external aqueous phase to obtain an oil-in-water emulsion;
    b) forming a second crosslinking layer by addition of an amine which reacts at an acidic pH;
    c) forming a third crosslinking layer by addition of a hydroxyl group donor;
    d) forming at least a fourth crosslinking layer by adding at least one amine which reacts at an alkaline pH, to obtain multilayer microcapsules;
    e) curing the multilayer microcapsules obtained in step d);.

2. The method according to claim 1, wherein the first crosslinking layer is formed from the protective colloid and the isocyanate in the presence of a catalyst.

3. The method according to claim 1, comprising adding a catalyst in a step a4) after step a3).

4. The method according to claim 1, wherein the at least one isocyanate having two or more isocyanate groups is selected from one or more isocyanates in the group consisting of aliphatic isocyanates and aromatic isocyanates.

5. The method according to claim 4, wherein the at least one isocyanate having two or more isocyanate groups comprises at least two aliphatic isocyanates having two or more isocyanate groups, wherein the at least two isocyanates have different chain lengths.

6. The method according to claim 1, comprising an additional optional step prior to curing in which a termination of microcapsule crosslinking is formed by addition of an amine having an amine functional group.

7. The method according to claim 1, wherein the protective colloid comprises a polysaccharide.

8. The method according to claim 1, wherein the catalyst comprises diazabicyclo [2.2.2] octane (DABCO).

9. The method according to claim 1, wherein the acid-reacting amine is an acidic amino acid hydrochloride.

10. The method according to claim 1, wherein the hydroxyl group donor comprises a polyol having two or more hydroxyl functional groups.

11. The method according to claim 1, wherein the alkaline reacting amine comprises a guanidinium group donor.

12. The method according to claim 1, wherein the amine used in an additional optional step prior to curing to terminate the microcapsule comprises an amino acid.

13. The method according to claim 1, wherein the at least one active ingredient to be encapsulated is one or more selected from the group of fragrance compounds, odiferous substances, flavorings, biocides, insecticides, a substance from the group of repellents, food additives, cosmetic active ingredients, pharmaceutical ingredients, agrochemicals, colorants, luminous colors, optical brighteners, solvents, waxes, silicone oils, lubricants, and mixtures of the aforementioned active ingredients.

14. A multilayer microcapsule comprising at least one hydrophobic odiferous substance or hydrophobic fragrance compound prepared by a process according to claim 1.

15. The method according to claim 1, further comprising separating the microcapsules from the reaction solution.

16. The method according to claim 7, wherein the protective colloid comprises a starch.

17. The method according to claim 9, wherein the acid-reacting amine comprises lysine hydrochloride and/or ornithine hydrochloride.

18. The method according to claim 10, wherein the hydroxyl group donor comprises one or more in the group of glycerol, propylene glycol, and 1,3,5-trihydroxybenzene.

\* \* \* \* \*